(12) United States Patent
Sugiyama

(10) Patent No.: US 10,972,622 B2
(45) Date of Patent: Apr. 6, 2021

(54) PRINT CONTROL DEVICE AND PROGRAM

(71) Applicant: Konica Minolta, Inc., Tokyo (JP)

(72) Inventor: Takanobu Sugiyama, Nishinomiya (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/866,650

(22) Filed: May 5, 2020

(65) Prior Publication Data

US 2020/0404114 A1 Dec. 24, 2020

(30) Foreign Application Priority Data

Jun. 21, 2019 (JP) .............................. JP2019-115433

(51) Int. Cl.
*G06F 3/12* (2006.01)
*H04N 1/00* (2006.01)

(52) U.S. Cl.
CPC ....... *H04N 1/00639* (2013.01); *H04N 1/0066* (2013.01); *H04N 1/00633* (2013.01)

(58) Field of Classification Search
None
See application file for complete search history.

(56) References Cited

U.S. PATENT DOCUMENTS

| 2012/0026522 A1* | 2/2012 | Igawa | G06F 3/0483 358/1.13 |
| 2014/0367907 A1* | 12/2014 | Mori | G03G 15/6544 270/1.01 |
| 2017/0039171 A1* | 2/2017 | Tashiro | G06F 40/134 |

FOREIGN PATENT DOCUMENTS

JP 2012027856 A 2/2012

* cited by examiner

*Primary Examiner* — Dung D Tran
(74) *Attorney, Agent, or Firm* — Buchanan Ingersoll & Rooney PC

(57) ABSTRACT

There is provided a non-transitory recording medium storing a computer readable program causing a computer, which is incorporated in a print control device that controls a print job, to perform: a) determining whether or not a reference source part included in a print target document related to the print job and a reference destination part included in the print target document and corresponding to the reference source part are arranged on different pages in a printout obtained by printing out the print target document; b) estimating a binding position in the printout; and c) changing at least one of arrangement target areas of the reference source part and the reference destination part based on the binding position and the arrangement position of the reference source part or the reference destination part, when it is determined that the reference source part and the reference destination part are arranged on different pages.

26 Claims, 35 Drawing Sheets

FIG. 5
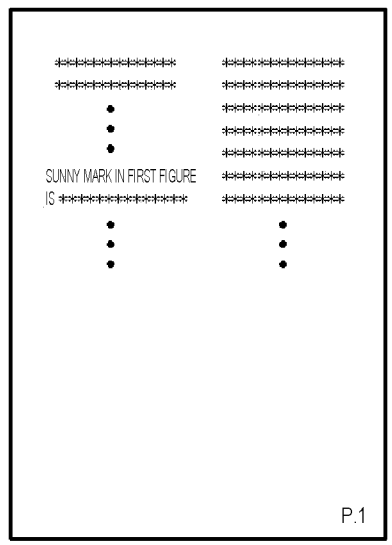
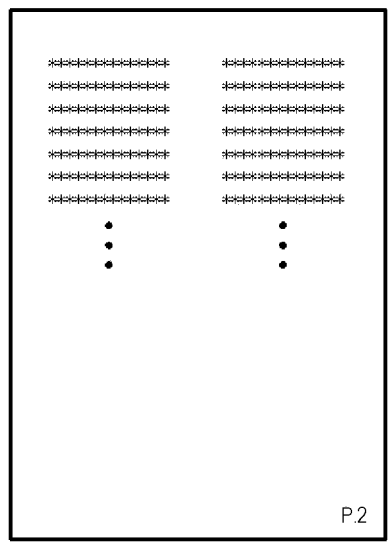
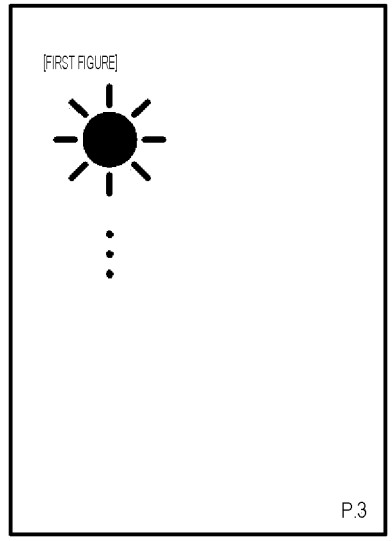

**********  ***********
**********  ***********
    .         *************
    .         *************
    .         *************
SUNNY MARK IN (FIRST FIGURE)  *************
IS **********  ***********
    .             .
    .             .
    .             .

P.1

PRINT CONTROL DEVICE AND PROGRAM

The entire disclosure of Japanese patent Application No. 2019-115433, filed on Jun. 21, 2019, is incorporated herein by reference in its entirety.

BACKGROUND

Technological Field

Embodiments of the present invention relate to a print control device that controls a print job, and a technique related thereto.

Description of the Related Art

There is a technique for printing out a print target document relating to a print job (refer to JP 2012-27856 A).

Incidentally, in a printout, the reference source part included in the text and the reference destination part (reference drawings or the like) corresponding to the reference source part may be arranged (described) on different pages. For example, in the patent publication, drawings are collectively arranged on pages behind the entire text, and the reference destination part (such as the reference drawing "First figure") corresponding to the reference source part (the character string "First Figure") in the text (for example, the specification) is arranged on a page different from the reference source part (later page).

In addition, a printout obtained by printing out a print target document may be bound with a staple or the like.

In the case where a printout is stapled, when a reference destination part of the bound printout is placed as it is at the original arrangement position in a print target document, as described below, the user my not be able to simultaneously see a reference source part and a reference destination part in the printout.

For example, it is assumed that a reference source part and a reference destination part corresponding to the reference source part are each arranged in left area on the front side of different sheets. Here, it is assumed that the printout is bound at the left end part (left side) of the printout.

In this case, first, the user reads the printout to the reference source part (for example, the reference source part arranged on the left area on the front side of the first sheet) included in the text of the printout. At this time, the user cannot see, for example, the reference destination part arranged in the left area on the front side of the third sheet.

Thereafter, the user turns over the first and second sheets and refers to the reference destination part arranged in the left area on the front side of the third sheet. However, at this time, the reference source part arranged in the left area on the front side of the first sheet is not visible.

As described above, when the reference destination part (the reference destination part corresponding to the reference source part) in the printout stapled or the like is arranged as it is at the original arrangement position in the print target document, the reference destination part is not arranged at an appropriate position in the printout, and in some cases, the user cannot simultaneously see the reference source part and the reference destination part in the printout.

SUMMARY

Therefore, an object of the present invention is to provide a technique capable of arranging a reference source part and a reference destination part corresponding to the reference source part at more appropriate positions in a bound printout.

To achieve the abovementioned object, according to an aspect of the present invention, there is provided a non-transitory recording medium storing a computer readable program, reflecting one aspect of the present invention, causing a computer, which is incorporated in a print control device that controls a print job, to perform: a) determining whether or not a reference source part included in a print target document related to the print job and a reference destination part included in the print target document and corresponding to the reference source part are arranged on different pages in a printout obtained by printing out the print target document; b) estimating a binding position in the printout; and c) changing at least one of arrangement target areas of the reference source part and the reference destination part in the printout based on the binding position and the arrangement position of the reference source part or the reference destination part in the printout, when it is determined in the a) that the reference source part and the reference destination part are arranged on different pages in the printout.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 5 is a diagram illustrating an entire print target document;

FIG. 6 is a view of a first page of a print target document,

DETAILED DESCRIPTION OF EMBODIMENTS

Hereinafter, one or more embodiments of the present invention will be described with reference to the drawings. However, the scope of the invention is not limited to the disclosed embodiments.

1. First Embodiment

1-1. System Configuration

Figure 1:
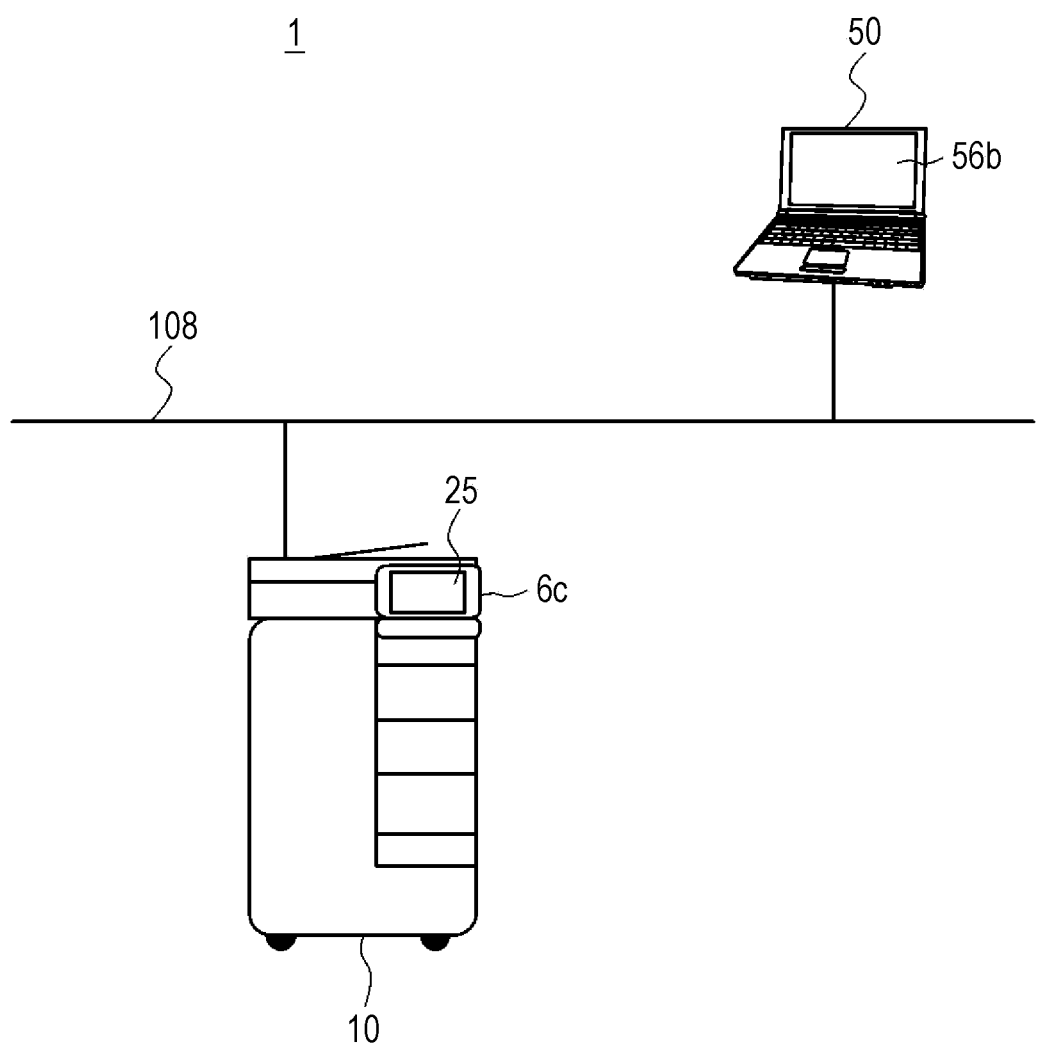
FIG. 1 is a schematic view illustrating a configuration of a printing system.

FIG. 1 is a schematic view illustrating a configuration of a printing system 1 according to an embodiment of the present invention. As illustrated in FIG. 1, the printing system 1 includes a print output device 10 and a print control device 50 that controls a print job. Here, a Multi-Functional Peripheral (MFP) is illustrated as the print output device 10, and a so-called personal computer (simply called computer) is illustrated as the print control device 50. Note that the embodiment of the present invention is not limited to this, and for example, the print output device 10 may be a single printer or the like, and the print control device 50 may be a tablet terminal or a smartphone.

An MFP 10 and a computer 50 are connected via a network 108 and can execute network communication. Note that the network 108 includes various networks such as a Local Area Network (LAN) and the Internet. Note that the connection form to the network 108 may be a wired connection or a wireless connection.

1-2. Configuration of MFP 10

Figure 2:
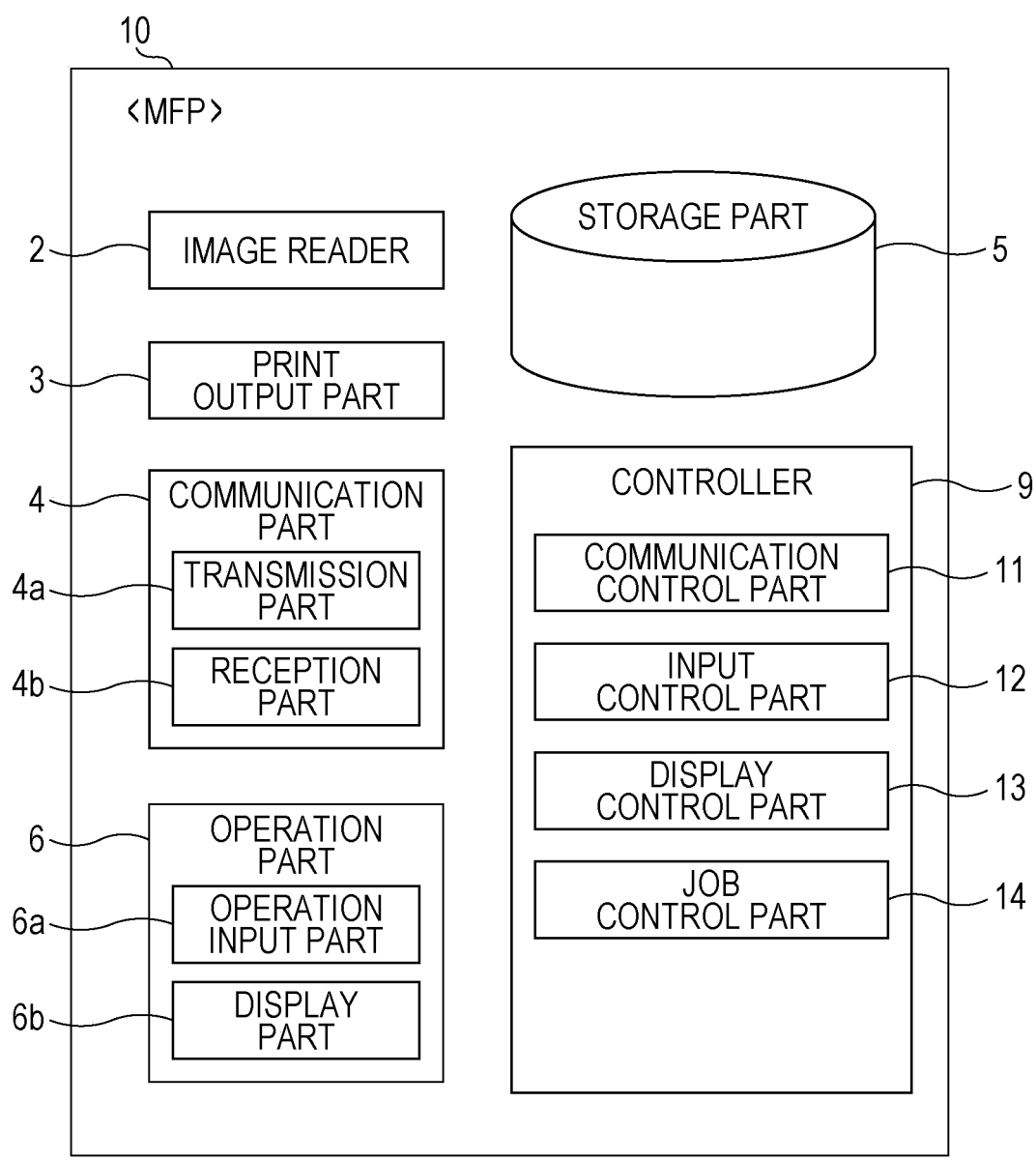
FIG. 2 is a functional block diagram of a print output device (MFP)

FIG. 2 is a functional block diagram of the MFP 10.

The MFP 10 is a device (also referred to as multifunction peripheral) having a scan function, a copy function, a facsimile function, a box storage function, and the like. Specifically, as illustrated in the functional block diagram of FIG. 2, the MFP 10 includes an image reader 2, a print output part 3, a communication part 4, a storage 5, an operation part 6, a controller 9 (control part), and the like, and the MFP 10 realizes various functions by operating these parts in combination. Note that the MFP 10 is also referred to as an image processing device or an image forming device.

The image reader 2 is a processor that optically reads (that is, scans) a document placed at a predetermined position of the MFP 10 and generates image data (also referred to as document image data or scan data) of the document.

The print output part 3 is an output part that prints out an image on various media such as paper based on image data on print target data specified by the user.

The communication part 4 is a processor capable of performing facsimile communication via a public line or the like. Further, the communication part 4 can perform network communication via the communication network 108. In this network communication, various protocols such as Transmission Control Protocol/Internet Protocol (TCP/IP) and File Transfer Protocol (FTP) are used, and by using the network communication, the MFP 10 can send and receive various data to and from a desired destination (such as the computer 50).

The communication part 4 includes a transmission part 4a for transmitting various data and a reception part 4b for receiving various data (such as print job data).

The storage 5 includes a storage device such as a hard disk drive (HDD).

The operation part 6 includes an operation input part 6a for receiving an operation input to the MFP 10, and a display part 6b for displaying and outputting various information. In this MFP 10, a substantially plate-shaped operation panel part 6c (refer to FIG. 1) is provided, and the operation panel part 6c has a touch panel (operation panel) 25 (refer to FIG. 1) on the front side. The touch panel 25 is configured by embedding a piezoelectric sensor or the like in a liquid crystal display panel, and it is possible to display various information and receive operation input from an operator.

The controller (control part) 9 is a control device that is built into the MFP 10 and controls the MFP 10 as a whole. The controller 9 is configured as a computer system including a CPU and various semiconductor memories (RAM, ROM, and the like). The controller 9 implements various processors by executing predetermined software programs (hereinafter, also simply referred to as a program) stored in a ROM (for example, EEPROM) in a CPU. Note that the program (specifically, a group of program modules) may be installed in the MFP 10 via a portable recording medium such as a USB memory or the network 108.

Specifically, as illustrated in FIG. 2, by executing the program, the controller 9 realizes various processors including a communication control part 11, an input control part 12, a display control part 13, and a job control part 14.

The communication control part 11 is a processor that controls a communication operation with another device (such as the computer 50).

The display control part 13 is a processor that controls a display operation on the display part 6b (the touch panel 25).

The input control part 12 is a processor that controls an operation of inputting to the operation input part 6a.

The job control part 14 is a processor (control part) that executes a print output operation based on print job data received from the computer 50 or the like.

Here, the above-described various operations are executed mainly by executing a software program on a CPU of the controller 9, but the embodiments are not limited thereto. The various operations described above may be executed by using dedicated hardware or the like provided in the MFP 10 (specifically, inside or outside the controller 9). For example, all or some of the communication control part 11, the input control part 12, the display control part 13, the job control part 14 (FIG. 2), and the like may be realized using one or a plurality of dedicated hardware components.

1-3. Configuration of Computer 50

Figure 3:
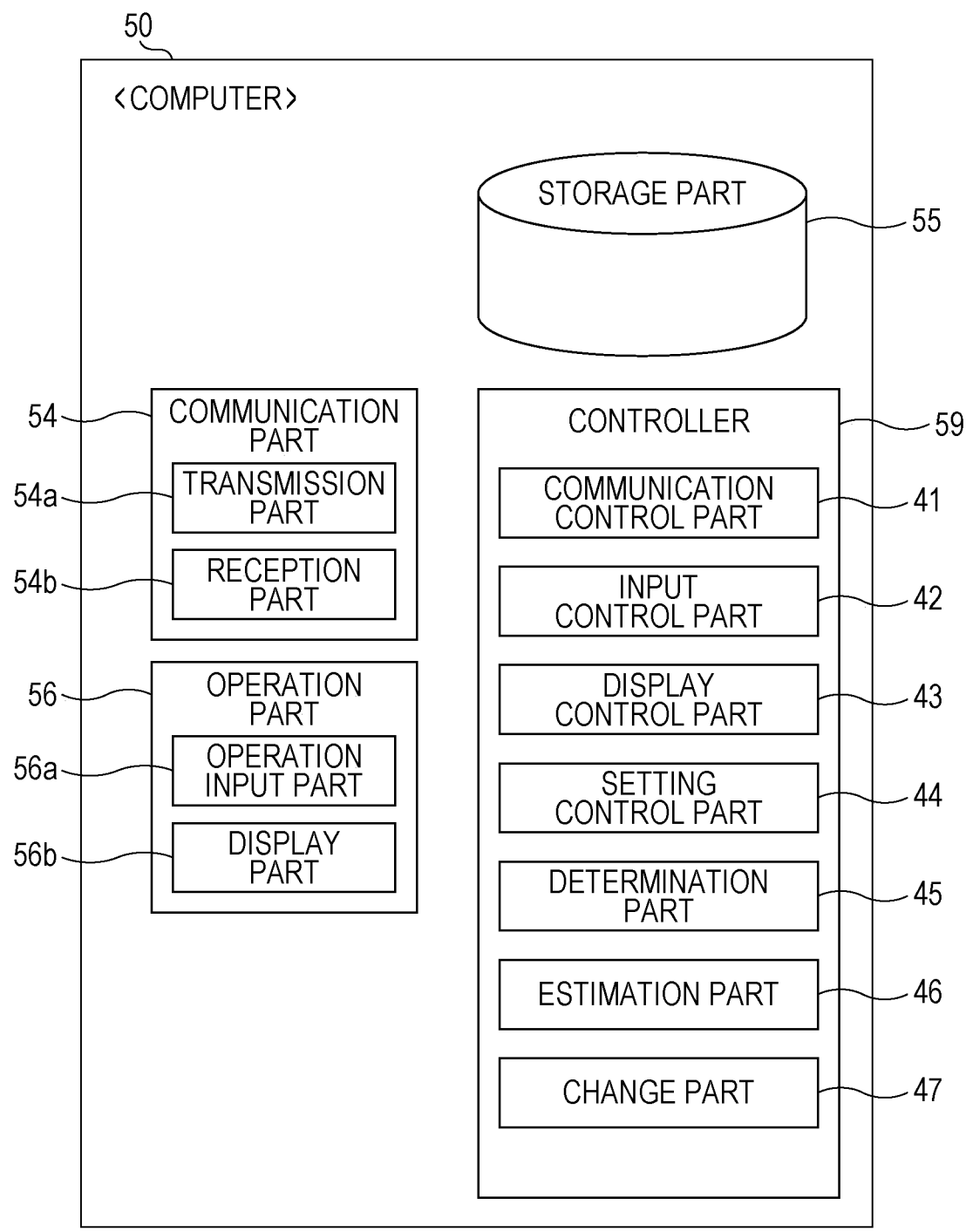
FIG. 3 is a functional block diagram of a print control device (computer)

FIG. 3 is a functional block diagram illustrating a schematic configuration of the computer 50.

The computer 50 is an information input/output terminal device (information processing device) capable of performing network communication with another device (such as the MFP 10).

As illustrated in the functional block diagram of FIG. 3, the computer 50 includes a communication part 54, a storage 55, an operation part 56, a controller (control part) 59, and the like, and realizes various functions by operating these parts in combination.

The communication part 54 is capable of performing network communication via a network. In this network communication, for example, various protocols such as Transmission Control Protocol/Internet Protocol (TCP/IP) are used. By using the network communication, the computer 50 can exchange various data with a desired destination (such as the MFP 10). The communication part 54 includes a transmission part 54a that transmits various data and a reception part 54b that receives various data.

The storage 55 is configured by a storage device such as a hard disk drive (HDD) and/or a semiconductor memory.

The operation part 56 includes an operation input part 56a that receives an operation input to the computer 50, and a display part 56b that displays and outputs various information (such as a print setting screen).

The controller (control part) 59 in FIG. 3 is a control device that is built in the computer 50 and controls the computer 50 as a whole. The controller 59 is configured as a computer system including a CPU and various semiconductor memories (RAM and ROM) and the like. The controller 59 realizes various processors by executing predetermined programs stored in a storage (semiconductor memory or the like) in the CPU. Note that the program (specifically, a group of program modules) may be recorded on a portable recording medium such as a USB memory, read from the recording medium, and installed on the computer 50. Alternatively, the program may be downloaded via the network 108 or the like and installed on the computer 50.

In the computer 50, a print control program (for example, a printer driver) is installed.

The controller 59 realizes various processors including a communication control part 41, an input control part 42, a display control part 43, a setting control part 44, a determination part 45, an estimation part 46, and a change part 47, by executing the program and the like.

The communication control part 41 is a processor that controls a communication operation with the MFP 10 and the like in cooperation with the communication part 54 and the like. For example, the communication control part 41 transmits job data (print job data) of the print job to the MFP 10 in cooperation with the communication part 54 (specifically, the transmission part 54a).

The input control part 42 is a control part that controls an operation (operation input operation) of receiving an operation input by the user in cooperation with the operation input part 56a. For example, the input control part 42 receives a setting operation from the user on the print setting screen in cooperation with the operation input part 56a.

The display control part 43 is a processor that controls a display operation of various information on the display part 56b (FIG. 1).

The setting control part (print control part) 44 is a processor that executes setting control and the like regarding setting contents of a print job (setting contents of each of a plurality of setting items related to a print job).

The determination part 45 is a processor that performs various determination operations. For example, the determination part 45 determines whether or not a reference source part 100 (refer to FIG. 6) included in a print target document D10 related to a print job and a reference destination part 200 (refer to FIG. 7) included in the print target document D10 and corresponding to the reference source part 100 are arranged on different pages in the printout (printout obtained by printing out the print target document D10) M10.

The estimation part 46 is a processor that executes processing (binding position estimation processing) for estimating (determining) the binding position B10 in the printout M10.

The change part 47 is a processor that executes a process of changing the arrangement target area of the reference destination part 200 in the printout M10 based on the binding position B10 and the arrangement position of the reference source part 100 in the printout M10. The change part 47 is also a determination part that determines the final arrangement target area (new arrangement target area) of the reference destination part 200 in the printout M10.

Here, the above-described various operations are executed mainly by executing a software program on a CPU of the controller 59, but the embodiments are not limited thereto. The various operations described above may be executed by using dedicated hardware or the like provided in the computer 50 (specifically, inside or outside the controller 59). For example, all or a part of the communication control part 41, the input control part 42, the display control part 43, the setting control part 44, the determination part 45, the estimation part 46, the change part 47 (FIG. 3), and the like may be realized by using one or a plurality of dedicated hardware components.

14. Operation

In the printing system 1, the computer 50 determines the arrangement target area of the reference destination part 200 corresponding to the reference source part 100 included in the print target document D10 (the arrangement target area in the printout M10 obtained by printing out the print target document D10). Specifically, based on the binding position B10 in the printout M10 and the arrangement position of the reference source part 100 in the printout M10, the arrangement target area of the reference destination part 200 in the printout M10 is changed.

Thereby, in the bound printout M10, the reference destination part 200 is not always arranged as it is in the original arrangement position in the print target document D10, and it is arranged at a position based on the binding position B10 and the arrangement position of the reference source part 100 in the printout M10. Therefore, the reference destination part 200 corresponding to the reference source part 100 can be arranged at a more appropriate position.

For example, as described below, when the reference source part 100 is arranged in the left area A10 (refer to FIG. 8) of the surface (front side) of the first sheet (for example, the first sheet Y10) in the printout M10, the right area A20 (refer to FIG. 9) of the front side of the second sheet (for example, a third sheet Y30) of the printout M10 is determined as the arrangement target area of the reference destination part 200. The left area (left half area) A10 is an area located on the same side as the binding position B10 (refer to FIG. 8 and the like) with respect to the reference position C10 in the left and right direction on the sheet surface, and the right area (right half area) A20 is an area located on the opposite side of the binding position B10 with respect to the reference position C10 in the left and right direction.

Figure 11:
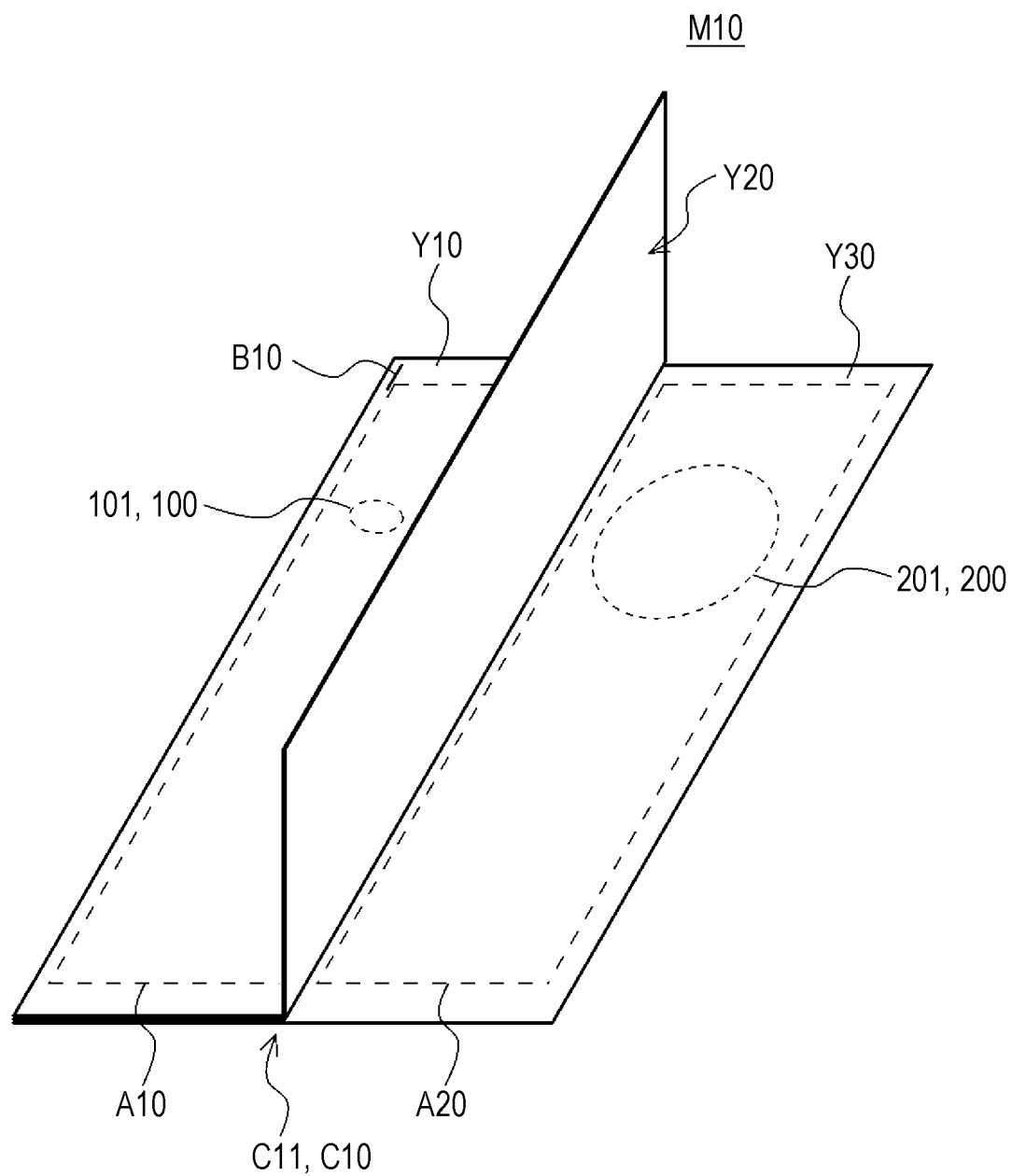
FIG. 11 is a view illustrating a state where right halves of the first and second sheets of a printout are turned up, and the right halves is standing in a substantially vertical direction.
Figure 12:
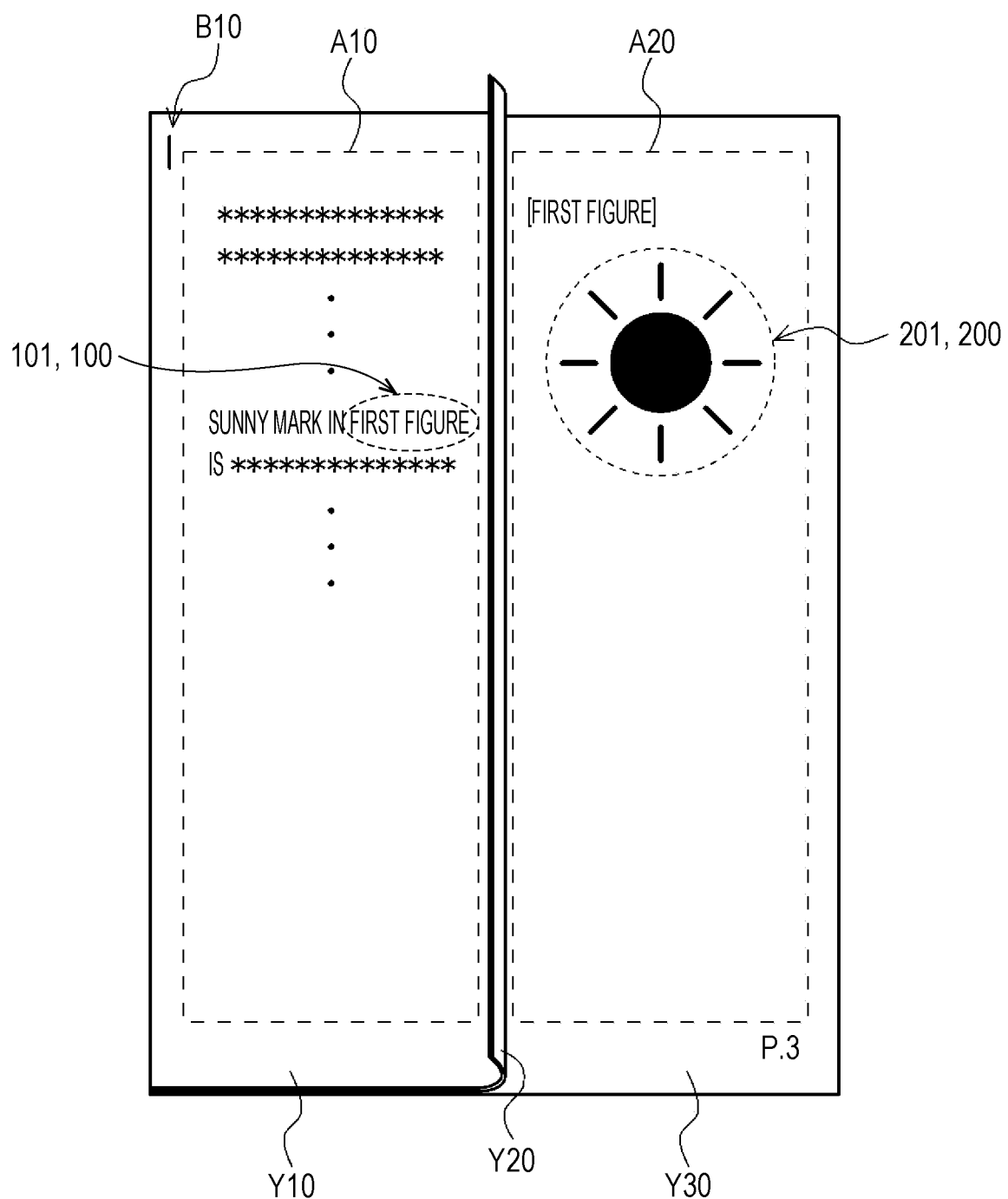
FIG. 12 is a view from a user looking down on a printout in the state of FIG. 11.

In this case, when the user turns up the right half of the first and second sheets Y10 and Y20 in the printout M10 to raise the right half in a substantially vertical direction (refer to FIG. 11), the user can visually recognize the reference destination part 200 (the reference destination part 200 in the right area A20 of the sheet Y30) that was not seen by the user due to the right half of the sheets Y10 and Y20 (refer to FIG. 12). Therefore, even when the reference source part 100 and the reference destination part 200 are described (arranged) on different pages in the bound printout M10, the user can simultaneously see the reference source part 100 and the reference destination part 200 in the printout M10. Therefore, the reference source part 100 and the reference destination part 200 can be arranged at more appropriate positions than when the reference source part 100 and the reference destination part 200 corresponding to the reference source part 100 are always arranged as it is at the original arrangement position in the print target document D10 in the bound printout M10.

Details of such an operation will be described below.

Figure 4:
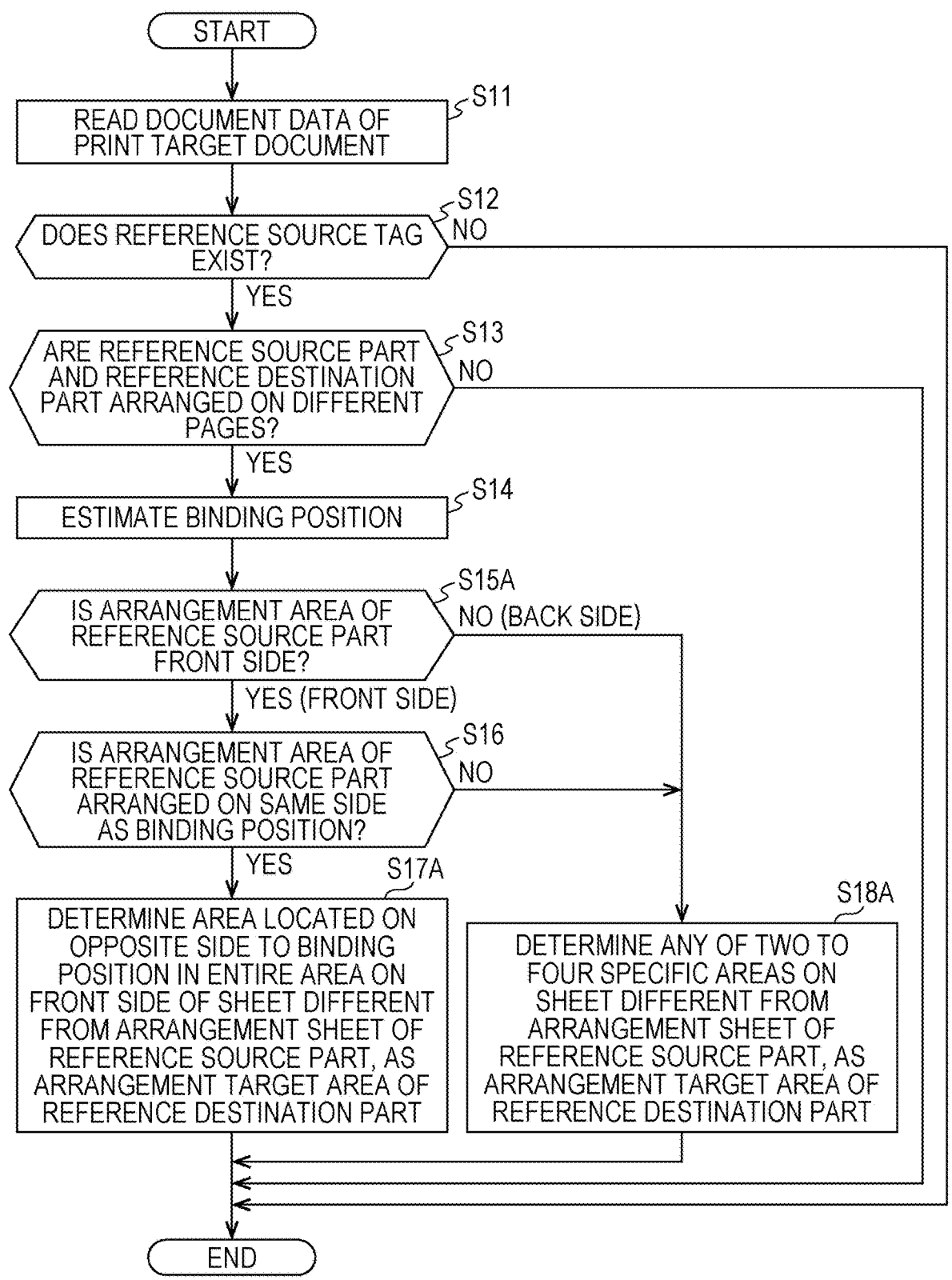
FIG. 4 is a flowchart illustrating an operation of a computer (operation of determining an arrangement target area of a reference destination part)

FIG. 4 is a flowchart of the operation of the computer 50 (specifically, a printer driver) (specifically, the operation of determining the arrangement target area of the reference destination part 200).

The operation of FIG. 4 is started, for example, in response to a print job data transmission instruction to the MFP 10 (a transmission instruction by a user).

Note that, prior to the operation of FIG. 4, the user creates a print target document D10 using the document creation application.

Figure 6:
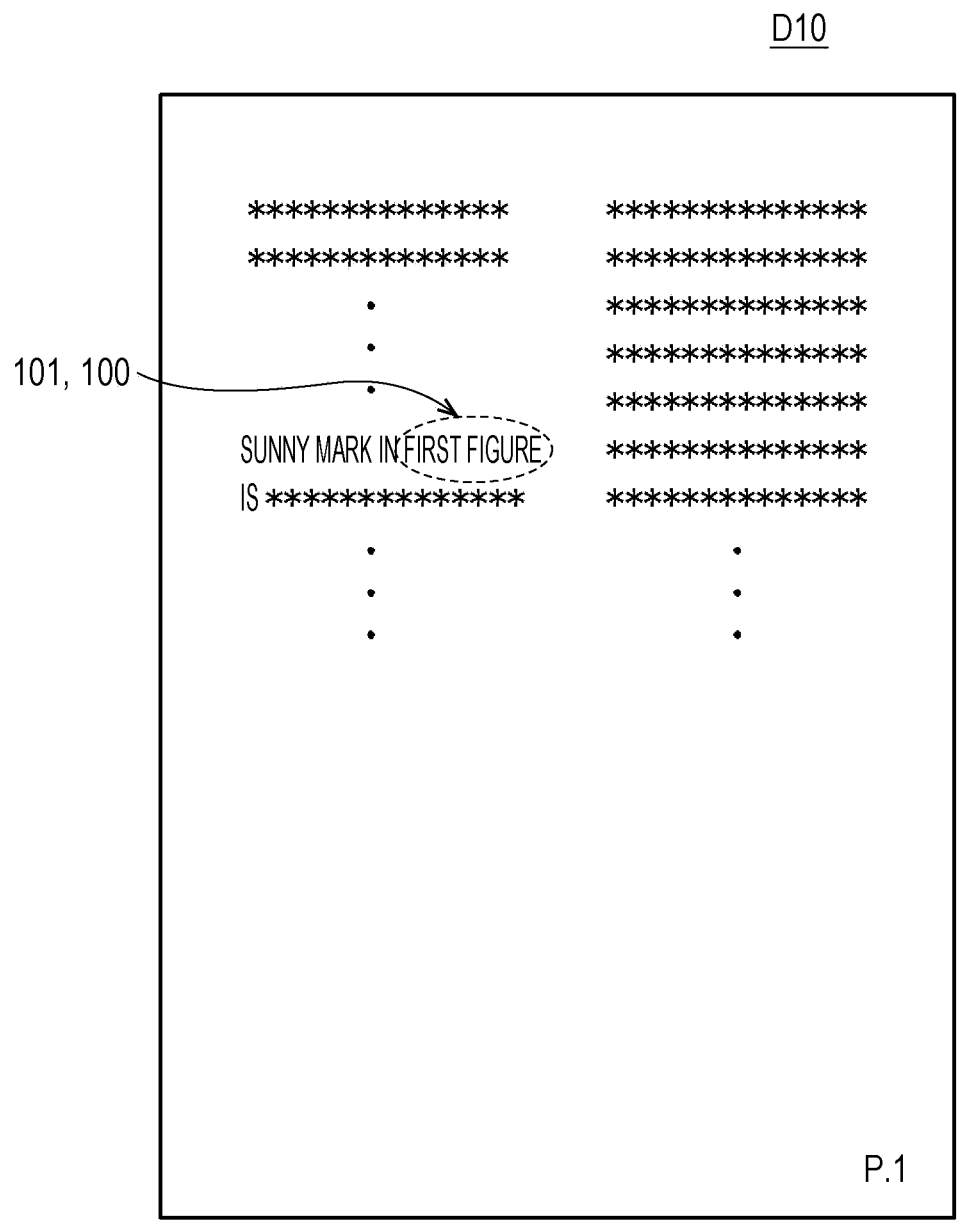
Figure 7:
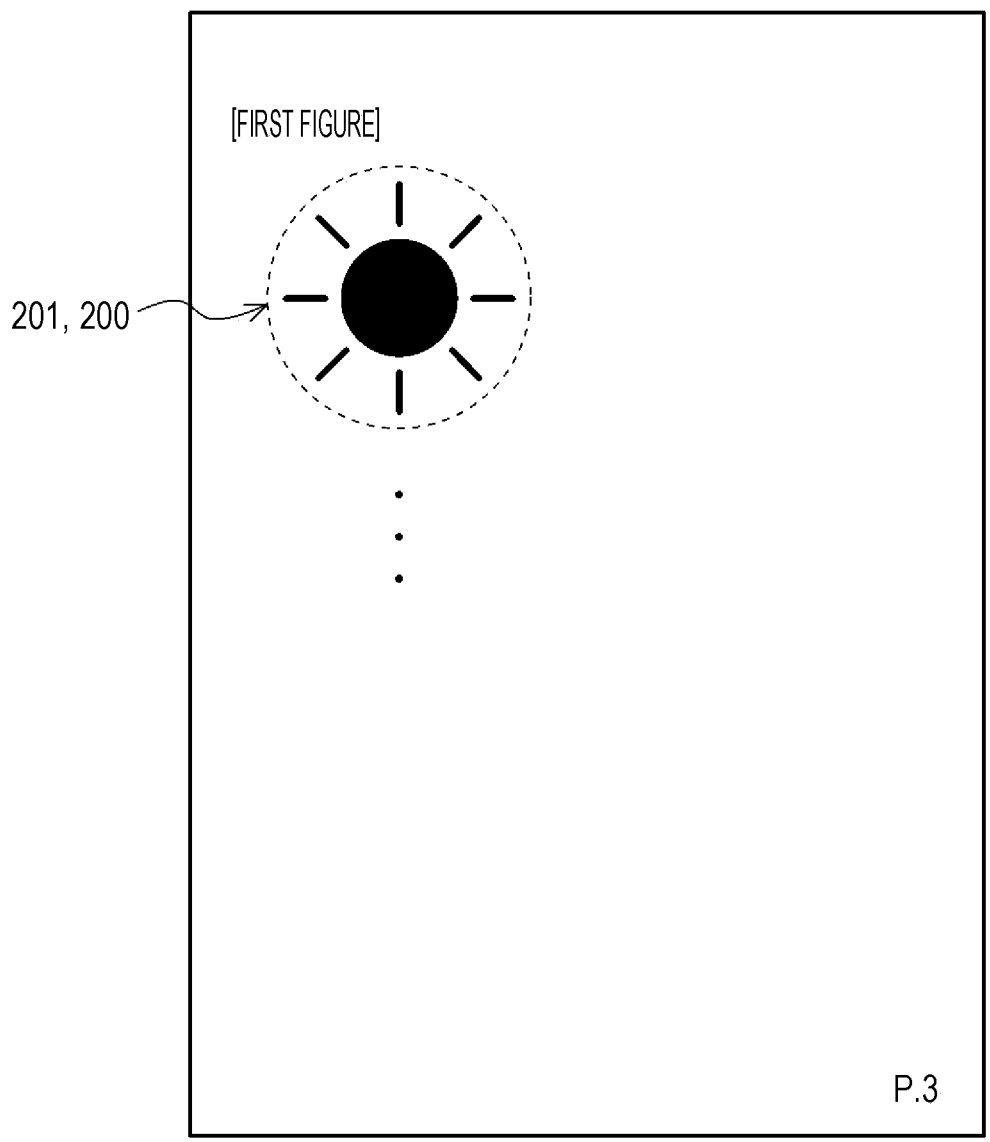
FIG. 7 is a view of a third page of a print target document.

Here, the print target document D10 having three pages is created. FIGS. 5 to 7 are views illustrating the print target document D10. Specifically, FIG. 5 is a view illustrating the entire print target document D0. FIG. 6 is a diagram illustrating a first page of the print target document D10, and FIG. 7 is a diagram illustrating a third page of the print target document D10. Here, it is assumed that the print target document D10 is composed of two columns (refer to FIG. 5). Note that the present invention is not limited to this, and the print target document D10 may be formed in ore column.

Further, in the print target document D10, the text and the drawing (chart) are described on different pages. For example, the text is described on the first and second pages of the print target document D10, and the drawing is described on the third page of the print target document D10.

In the document data of the print target document D10, the reference source part 100 included in the text and the reference destination part 200 corresponding to the reference source part 100 are associated with each other using tag data (tag format data).

Specifically, in the document data of the print target document D10, a reference source tag (described later) and a reference destination tag are described. In other words, in the document data of the print target document D10, the reference source tag is added to the reference source part 100, and the reference destination tag is added to the reference destination part 200. Note that the tag data (reference source tag and reference destination tag) embedded in the document data of the print target document D10 is not actually displayed.

The reference destination tag is tag data (reference destination tag data) indicating the position of the reference destination part 200. As the reference destination tag, for example, <a name="anchor name"> is used. In the reference destination tag, an arbitrary anchor name (character information for specifying the reference destination tag) is described. By describing such a reference destination tag immediately before the reference destination part 200, the arrangement position of the reference destination part 200 is indicated. Here, the reference drawing (image data of the reference drawing) is arranged in the reference destination part 200.

The reference source tag is tag data (reference source tag data) indicating the position of the reference source part 100, and is also tag data that specifies the reference destination part 200 (specifically, the reference destination tag) corresponding to the reference source part 100. For example, <a href="#anchor name"> is used as the reference source tag. In the reference source tag, the anchor name described in the reference destination tag of the reference destination part 200 corresponding to the reference source part 100 is described. By associating the reference source tag with the reference destination tag in this manner, the reference source part 100 and the reference destination part 200 are associated with each other.

Such tag data is added (described) by the user (document creator) to create the print target document D10.

Here, in the print target document D10, the reference source part 101 is described on the first page of the print target document D10 (refer to FIG. 6), and the reference destination part 201 corresponding to the reference source part 101 is described on the third page of the print target document D10 (refer to FIG. 7).

After creating the print target document D10 using a document creation application in this manner, the user adds an instruction to start a printer driver in the document creation application. In response to the start instruction, a print job setting screen (not illustrated) is displayed on the display part 56b of the computer 50, and the user performs various print job setting operations using the setting screen.

Then, when the user adds an instruction to transmit print job data to the MFP 10, the operation of FIG. 4 is started.

Hereinafter, the case where the setting for "single-sided printing" of the print target document D10 and the case where the setting for "double-sided printing" of the print target document D10 is made will be sequentially described.

For Single-Sided Printing

First, an operation in the case where the setting of "single-sided printing" of the print target document D10 having three pages is performed prior to the operation of FIG. 4 will be described. Note that, in this case, it is assumed that a setting not using a page aggregation function is made.

In step S11, the computer 50 reads document data of the print target document D10 created using a document creation application.

Then, in step S12, the computer 50 searches for the reference source tag (tag data indicating the position of the reference source part 100) in the document data of the print target document D10, and determines whether or not the reference source tag exists in the document data. In other words, it is determined whether or not the reference source part 100 exists in the print target document D10.

For example, prior to the operation of FIG. 4, when the user performs the operation of adding the reference tag data (at the time of creating the print target document D10), it is determined in step S12 that reference tag data exists in the document data, and the process proceeds from step S12 to step S13.

On the other hand, prior to the operation of FIG. 4 (at the time of creating the print target document D10), when the user has not performed the operation of adding the reference source tag, it is determined in step S12 that the reference source tag does not exist in the document data, and the operation in FIG. 4 ends. Then, the print job data is transmitted from the computer 50 to the MFP 10, and the MFP 10 executes a print output process of the print target document D10.

Here, the user performs an additional operation of adding a reference source tag to the reference source part 101 (reference source text "First Figure") at the time of creating the print target document D10, and it is determined in step S12 that a reference source tag exists in the document data of the print target document D10. Then, the process proceeds from step S12 to step S13.

In step S13, in the printout M10 obtained by printing out the print target document D10, the computer 50 determines whether the reference source part 100 (here, 101) and the reference destination part 200 (here, 201) corresponding to the reference source part 100 are arranged on different pages.

Specifically, it is determined whether or not the reference source part 101 and the reference destination part 201 are arranged on different pages in the printout M10 (printout obtained by temporarily printing out the print target document D10 as it is based on the setting contents of a print job) before the change of the arrangement target area of the reference destination part 200. The printout M10 before the change is also expressed as a virtual printout obtained by virtually printing out the print target document D10 based on the setting contents of the print job.

More specifically, first, the computer 50 generates image data (preview data) of the virtual printout (the printout M10 before the change).

Then the computer 50 specifies the page on which the reference source part 100 is arranged in the virtual printout based on the reference source tag (tag data indicating the position of the reference source part 101) in the document data of the print target document D10. More specifically, the computer 50 specifies the arrangement page of the reference source part 100 in the virtual printout based on the arrangement position of the reference source tag in the document data of the print target document D10 (in which page in the virtual printout the reference source tag is arranged).

Further, the computer 50 specifies the reference destination tag (tag data indicating the position of the reference destination part 200) of the reference destination part 201 corresponding to the reference source part 101 based on the anchor name described in the reference source tag, and the arrangement page of the reference destination part 200 in the virtual printout is specified based on the reference destination tag. More specifically, the computer 50 specifies the arrangement page of the reference destination part 200 in the virtual printout based on the arrangement position of the reference destination tag in the document data of the print target document D10 (in which page in the virtual printout the reference destination tag is arranged).

Then, the computer 50 determines whether or not the reference source part 100 and the reference destination part 200 are arranged on different pages in the virtual printout.

Here, it is determined that the reference source part 101 (the reference source tag added to the reference source part 101) is arranged on the first page (first sheet Y10) of the virtual printout (refer to FIG. 6). In addition, it is determined that the reference destination part 201 (the reference destination tag added to the reference destination part 201) is arranged on the third page (third sheet Y30) of the virtual printout (refer to FIG. 7). Therefore, it is determined in step S13 that the reference source part 101 and the reference destination part 201 in the virtual printout (the printout M10 before change) are arranged on different pages. Then, the process proceeds from step S13 to step S14.

Note that, for example, when the reference source part 100 and the reference destination part 200 are described on the same page in the virtual printout, it is determined in step S13 that the reference source part 100 and the reference destination part 200 are not arranged on different pages in the printout M10 (that the reference source part 100 and the reference destination part 200 are arranged on the same page in the printout M10). Then, the operation of FIG. 4 ends without performing the process of changing the arrangement target area of the reference destination part 200 (steps S14 to S18A).

In the next steps S14 to S18A, the computer 50 changes (determines) the arrangement target area of the reference destination part 201 in the printout M10.

First, in step S14, the computer 50 estimates (determines) the binding position B10 (refer to FIG. 8 and the like) in the printout M10 (specifically, the virtual printout), based on the setting contents (setting contents in the setting operation performed prior to the operation in FIG. 4) of the setting item "binding direction" in the print job.

For example, when the setting item "binding direction" is set to the setting value "left binding", the position of the left end part (left side) of the sheet is estimated as the binding position B10 (refer to FIG. 8) in the printout M10. Further, when the setting item "binding direction" is set to the setting value "right binding", the right end part (right side) of the sheet is estimated as the binding position B10 in the printout M10. Further, when the setting item "binding direction" is set to the setting value "top binding", the upper end part (upper side) of the sheet is estimated as the binding position B10.

Here, the setting item "binding direction" is set to the setting value "left binding", and the left end part (left side) of the sheet is estimated as the binding position B10 in the printout M10. Then, the process proceeds from step S14 to step S15A.

In step S15A, the computer 50 determines whether or not the reference source part 100 (here, 101) is arranged on the front side of the sheet in the printout M10 (specifically, the virtual printout), based on the setting contents of the setting item "single-sided/double-sided" (printout side) in the print job.

For example, when the setting item "single-sided/double-sided" is set to the set value "single-sided" (in other words, when the printout M10 is printed on one side), it is determined in step SBA that the reference source part 101 of the printout M10 is arranged on the front side of the sheet. Then, the process proceeds from step S15A to step S16.

When the setting item "single-sided/double-sided" is set to the setting value "double-sided" (in other words, when the printout M10 is printed on both sides), the computer 50 further determines whether or not the reference source part 100 is arranged on the front side of the sheet in the printout M10, based on whether the written page of the reference source part 100 in the printout M10 (specifically, the virtual printout) is an odd page.

For example, when it is determined based on the arrangement position of the reference source tag of the reference source part 100 in the virtual printout that the written page of the reference source part 100 in the virtual printout is an odd page, it is determined in step S15A that the reference source part 100 in the printout M10 is arranged on the front side of the sheet. Then, the process proceeds from step S15A to step S16.

On the other hand, when it is determined that the arrangement page of the reference source part 100 in the virtual printout is an even page, it is determined in step S15A that the reference source part 100 in the printout MO is arranged on the back side of the sheet, and the process proceeds from step S15A to step S18A.

Here, the setting item "single-sided/double-sided" is set to the set value "single-sided", it is determined in step S15A that the reference source part 101 in the printout M10 is arranged on the front side of the sheet. Then, the process proceeds from step S15A to step S16. Note that the operation when the setting item "single/double-sided" is set to the set value "double-sided" will be described later.

In step S16, the computer 50 determines whether or not the reference source part 101 is arranged in an area located on the same side as the binding position B10 with respect to the reference position C10 in a specific direction on the sheet surface in the entire area of the front side of the arrangement sheet of the reference source part 101 in the printout M10 (sheet on which the reference source part 101 is arranged in the printout M10).

Specifically, first, the computer 50 divides the entire front side area of the arrangement sheet (for example, the first sheet Y10) of the reference source part 101 in the printout M10 (specifically, the virtual printout) into two divided areas at the reference position C10 (here, a center position C11) in a specific direction, based on the setting contents of the setting item "binding direction" in the print job.

For example, when the setting contents of the setting item "binding direction" is the setting value "left binding" or the setting value "right binding" at the center position C11 in the left and right direction, the arrangement sheet Y10 of the reference source part 101 is divided into two divided areas, a left area A10 (refer to FIG. 8) and a right area A20.

Figure 22:
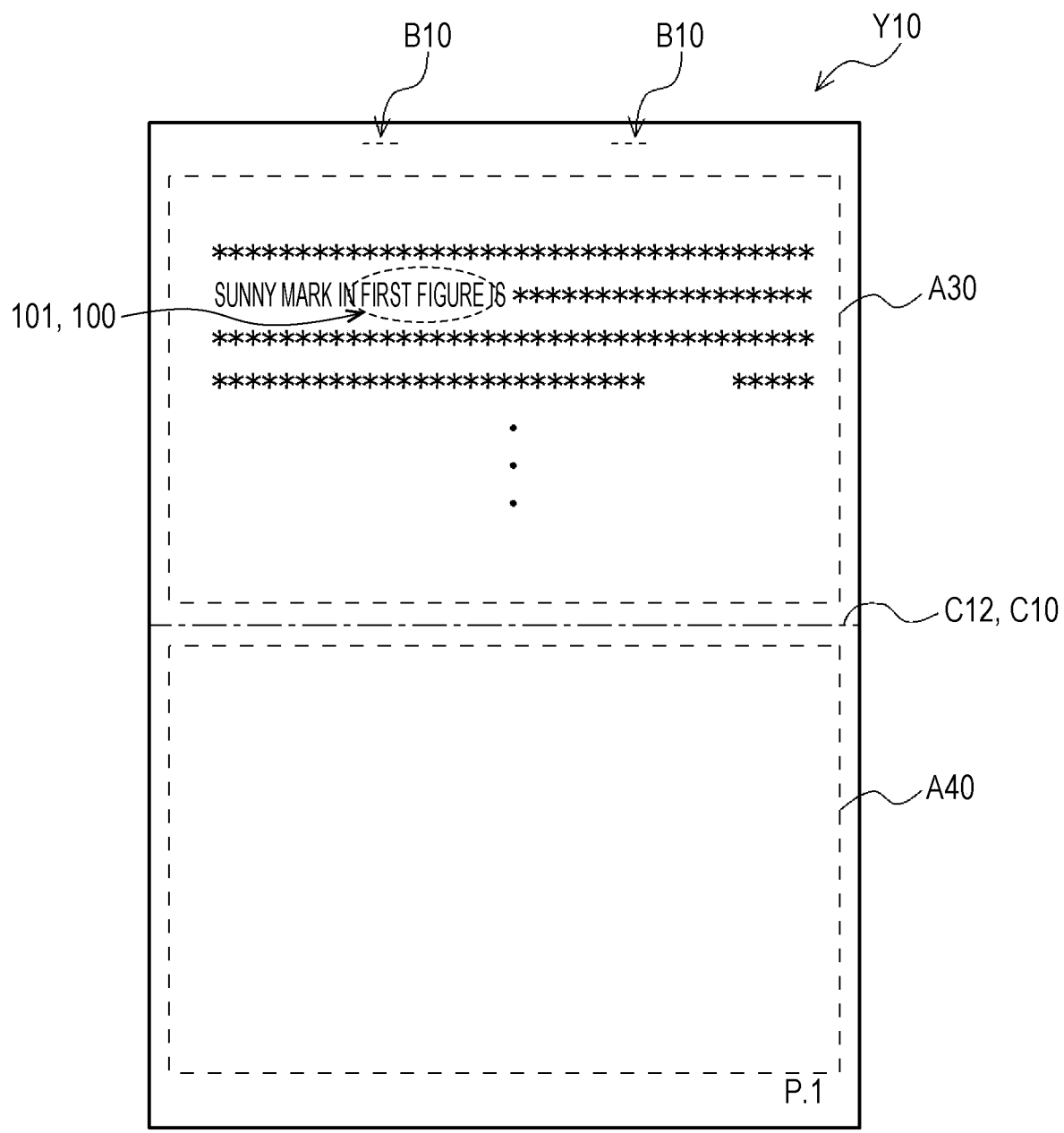
FIG. 22 is a view illustrating the first page of a printout (when the printout is bound at the upper end of a sheet)

Further, for example, when the setting contents of the setting item "binding direction" is the setting value "top binding", at the center position C12 (C10) in the up and down direction of the sheet surface (FIG. 22), the arrangement sheet Y10 of the reference source part 101 is divided into two divided areas, an upper area A30 and a lower area A40.

Here, the setting contents of the setting item "binding direction" is set to the setting value "left binding", the arrangement sheet Y10 of the reference source part 101 is divided into two divided areas, the left area A10 and the right area A20.

Then, the computer 50 determines whether or not the reference source part 101 is arranged in the area located on the same side as the binding position B10 with respect to the reference position C10 in the left and right direction in two divided areas on the arrangement sheet Y10 for the reference source part 101. Specifically, it is determined whether or not the reference source part 101 is arranged in an area on the same side as the binding position B10 with respect to the reference position C10 in the left and right direction among the two divided areas on the arrangement sheet Y10, based on the position of the reference source part 101 specified in step S13 (arrangement position in the virtual printout).

For example, when it is determined that the binding position B10 is included in the left area A10 in the printout M10 and the reference source part 101 is arranged in the left area A10 of the arrangement sheet Y10 of the reference source part 101, it is determined in step S16 that the reference source part 101 is arranged in an area on the same side as the binding position B10 with respect to the reference position C10 in the left and right direction. Then, the process proceeds from step S16 to step S17A. Note that the operation when the reference source part 101 is arranged in the right area A20 of the arrangement sheet Y10 will be described later.

In step S17A, the computer 50 determines an area that is located on the opposite side to the binding position B10 with respect to the reference position C10 in a specific direction (here, left and right direction) in the entire area on the front side of the sheet different from the arrangement sheet Y10 of the reference source part 101, as the arrangement target area of the reference destination part 201.

Specifically, first, in the printout M10 (specifically, the virtual printout), the entire front side area of the sheet (for example, the third sheet Y30) other than the arrangement sheet Y10 of the reference source part 101 is divided into two divided areas at the center position C11 in the specific direction. Here, the sheet Y30 is divided into two divided areas, a left area A10 and a right area A20 (refer to FIG. 9). Then, the right area A20 of the two divided areas, the left area A10 and the right area A20, on the front side of the sheet Y30 (an area located on the side opposite to the binding position B10 with respect to the center position C11 in the left and right direction) is determined as the arrangement target area (new arrangement area) of the reference destination part 201.

Then, the operation in FIG. 4 ends, and the print job data is transmitted from the computer 50 to the MFP 10. The print job data includes the document data of the print target document D10 and various setting contents. The document data describes that the reference destination part 201 is to be arranged in the right area A20 (arrangement target area) of the sheet Y30 in the printout M10.

Thereafter, the MFP 10 prints out the print target document D10 based on the print job data, and discharges the printout M10 (printout after changing the arrangement target area of the reference destination part 200) to a discharge tray (not illustrated). Then, the user (reader) that has received the printout M10 binds the printout M10 with staples or the like (refer to FIG. 10) and reads the printout M10.

At this time, as described below, the user can simultaneously view the reference source part 101 and the reference destination part 201 in the bound printout M10 (changed printout M10).

Figure 10:
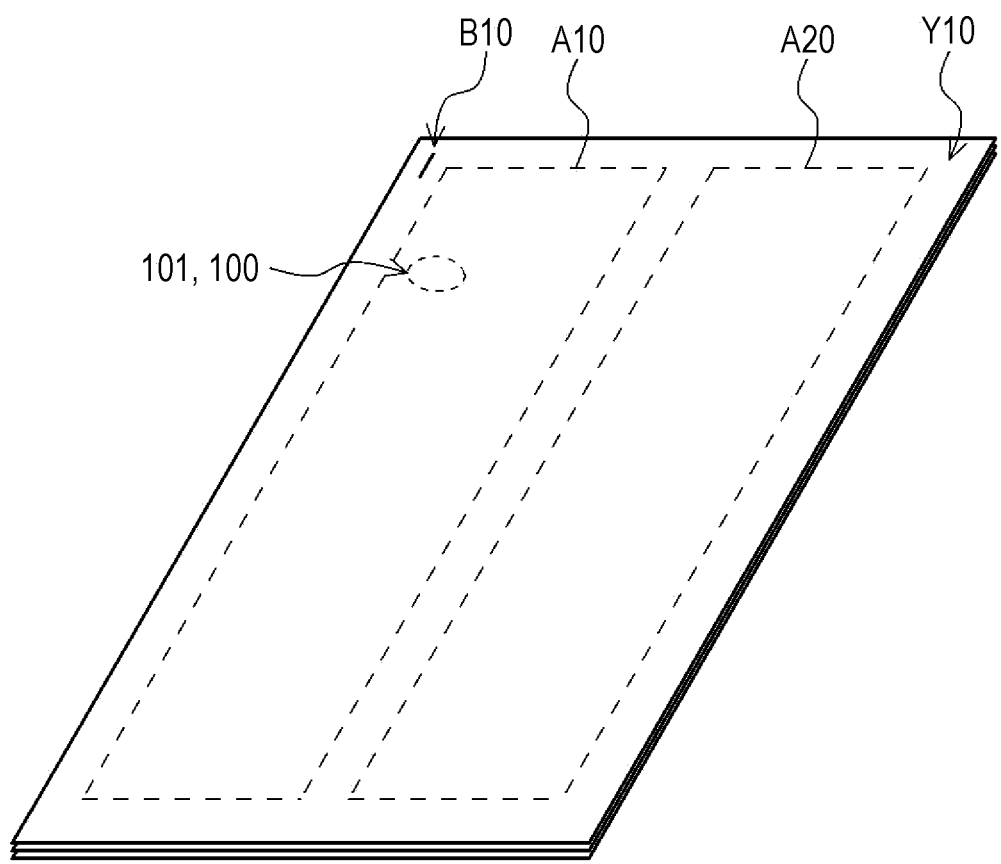
FIG. 10 is a view of a printout in a state of being stapled.

Specifically, when the user turns up the right half of the first and second sheets Y10 and Y20 in the printout M10 of FIG. 10 and raises the right half in a substantially vertical direction (refer to FIG. 11), the user can visually recognize the reference destination part 201 (the reference destination part 200 arranged in the right area A20 of the sheet Y30) that was not seen by the user due to the right half of the sheets Y10 and Y20 (refer to FIG. 12). In FIG. 11, the right half (right half area) of the sheets Y10 and Y20 (sheets from the sleet Y10 of the reference source part 101 to the sheet Y20 immediately before the sheet Y30 of the reference destination part 201 in the printout M10) is turned up, and the right half is standing in a substantially vertical direction near the center position C11 (standing state). Further, FIG. 12 shows how the user looks down at the printout M10 in the state of FIG. 11.

As described above, even when the reference source part 101 and the reference destination part 202 are arranged (described) on different pages in the bound printout M10, the user can simultaneously see the reference source part 101 and the reference destination part 201 in the printout M10. Therefore, the reference destination part 201 can be arranged at more appropriate positions than when the reference destination part 201 corresponding to the reference source part 101 are always arranged as it is at the original arrangement position in the print target document D10 in the bound printout M10.

Again, the description returns to step S16.

For example, when the binding position B10 is included in the left area A10 in the printout M10, and the reference source part 100 (101) is arranged in the right area A20 (FIG. 8) of the sheet Y10 in the printout M10, it is determined in step S16 that the reference source part 100 is arranged in an area located on the side opposite to the binding position B10 with respect to the reference position C10 in the left and right direction. Then, the process proceeds from step S16 to step S18A.

In step S18A, the computer 50 determines one of two specific areas (described below) on the sheet (for example, sheet Y30) different from the arrangement sheet Y10 of the reference source part 100 (101) as the arrangement target area of the reference destination part 200 (201) corresponding to the reference source part 100 (101).

Specifically, when the printout M10 is printed on only one side, one of the two specific areas, the left area A10 (FIG. 13) and the right area A20 (FIG. 14) on the front side of the sheet Y30 is determined as the arrangement target area of the reference destination part 200 (201).

For example, the left area A10 (FIG. 13) of the front side of the sheet Y30 is determined as the arrangement target area of the reference destination part 201.

Further in this case, as described below, the user can simultaneously view the reference source part 100 and the reference destination part 200 in the bound printout M10. Specifically, the user mountain-folds the sheets Y10 and Y20 in the printout M10 (FIG. 10) right and left near the center position C11, and brings the right end parts of the sheets Y10 and Y20 close to the left end part of the sheet Y30 (refer to FIG. 13). Thus, the user can view the reference source part 101 arranged in the right area A20 of the front side of the sheet Y10 and the reference destination part 201 arranged in the left area A10 on the front side of the sheet Y30 at the same time.

Alternatively, the right area A20 (FIG. 14) of the front side of the sheet Y30 may be determined as the arrangement target area of the reference destination part 201. Even in this case, by folding the sheets Y10 and Y20 in the same manner as in FIG. 13 (refer to FIG. 14), the user can simultaneously view the reference source part 101 arranged in the right area A20 of the front side of the sheet Y10 and the reference destination part 201 arranged in the right area A20 of the front side of the sheet Y30.

For Double-Sided Printing

Next, an operation in the case where the setting to print out the print target document D10 on "double-sides" is made prior to the operation in FIG. 4 will be described.

When the print target document D10 is printed on both sides, the arrangement area of the reference source part 101 on the sheet Y10 in the printout M10 is any of the following:
(1) Left area A10 of "front side" of sleet Y10,
(2) Right area A20 of "front side" of sheet Y10,
(3) Left area A10 of "back side" of sheet Y10, and
(4) Right area A20 of "back side" of sheet Y10. Here, it is assumed that the setting item "binding direction" is set to the setting value "left binding".

Each operation in the case where the reference source part 101 is arranged in each of the areas (1) to (4) will be described in order.

First, (1) when the reference source part 101 is arranged in the left area A10 of the "front side" of the sheet Y10 (an area located on the same side as the binding position B10 with respect to the reference position C10 in the left and right direction of the sheet), the following operation is performed.

Specifically, when the reference source part 101 is arranged in the left area A10 (FIG. 8) of the "front side" of the sheet Y10, the process proceeds to steps S15A, S16, and S17A via steps S11 to S14.

Then, in step S17A, in the printout M10, the right area A20 (area located on the opposite side to the binding position B10 with respect to the reference position C10 in the left and right direction) of the front side of the sheet (for example, the second sheet Y20) other than the arrangement sheet Y10 of the reference source part 101 is determined as the arrangement target area of the reference destination part 201.

In this case, as in the case of single-sided printing, by setting the right half of the sheet Y10 in the printout M10 in an upright state (also refer to FIG. 11), the user can view the reference source part 101 arranged in the left ara A10 on the front side of the sheet Y10 and the reference destination part 201 arranged in the right area A20 of the front side of the sheet Y20 at the same time.

Next, (2) when the reference source part 101 is arranged in the right area A20 (in other words, an area located on the opposite side of the binding position B10 with respect to the reference position C10 in the left and right direction of the sheet) of the "front side" of the sheet Y10, the following operation is performed.

Specifically, when the reference source part 101 is arranged in the right area A20 (also refer to FIG. 8) of the "front side" of the sheet Y10, the process proceeds to steps S15A, S16, and S18A via steps S1 to S14.

Then, in step S18A, the computer 50 determines any of the three specific areas (described below) on a sheet (for example, the second sheet Y20) different from the arrangement sheet Y10 of the reference source part 101 as the arrangement target area of the reference destination part 201.

Specifically, when the printout M10 is printed on both sides, one of the left area A10 and the right area A20 of the "front side" of the sheet Y20 and three specific areas with the left area A10 of the "back side" of the sheet Y20 is determined as the arrangement target area of the reference destination part 201.

Figure 15:
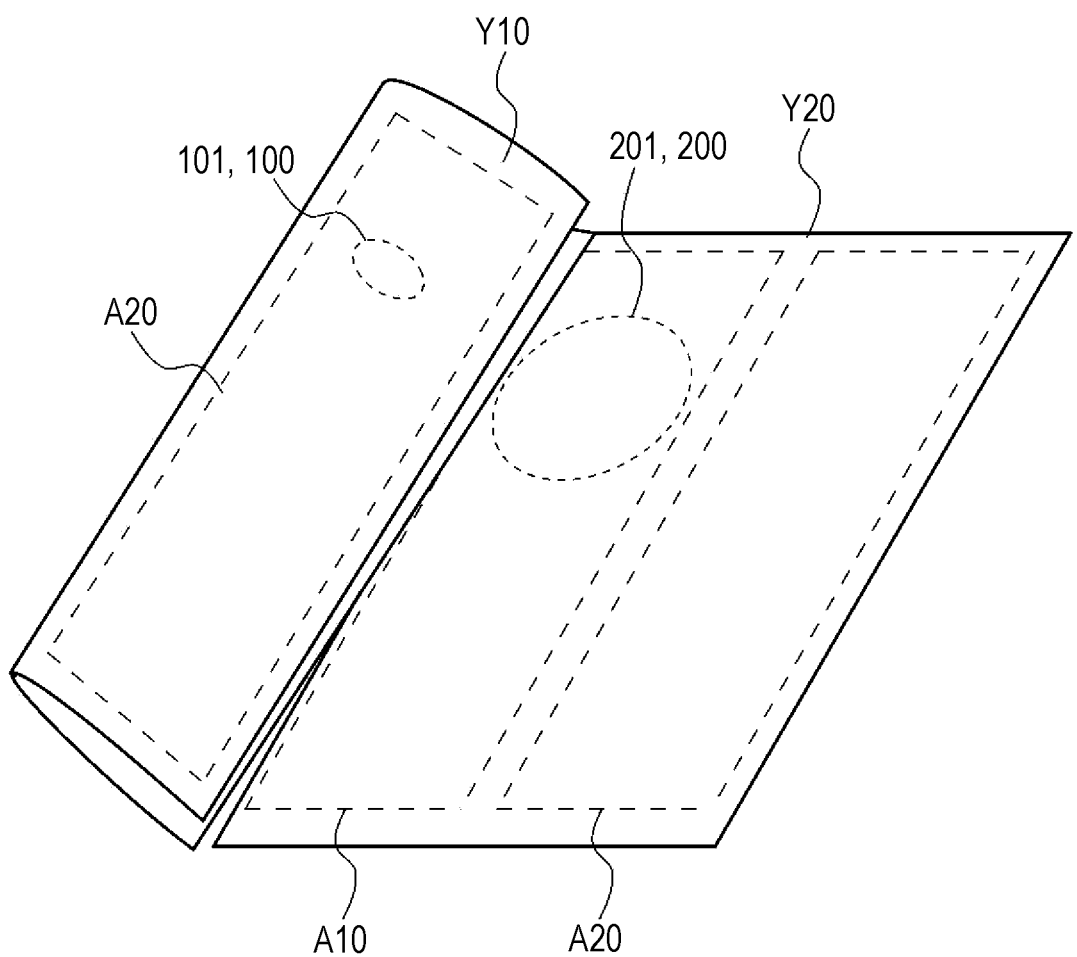
FIG. 15 is a view illustrating a state in which a first sleet of the printout in the state of FIG. 10 are folded right and left and mountain-folded near the center position, and a right end part of the first sheet is brought close to a left end part of a second sheet.

For example, the left area A10 (FIG. 15) of the "front side" of the sheet Y20 in the printout M10 is determined as the arrangement target area of the reference destination part 201. In this case, the user mountain-folds the sheet Y10 of the printout M10 right and left near the center position C11, and brings the right end of the sheet Y10 close to the left end of the sheet Y20 (refer to FIG. 15). Thus, the user can view the reference source part 101 arranged in the right area A20 of the front side of the sheet Y10 and the reference destination part 201 arranged in the left ara A10 (FIG. 15) on the front side of the sheet Y20 at the same time.

Figure 16:
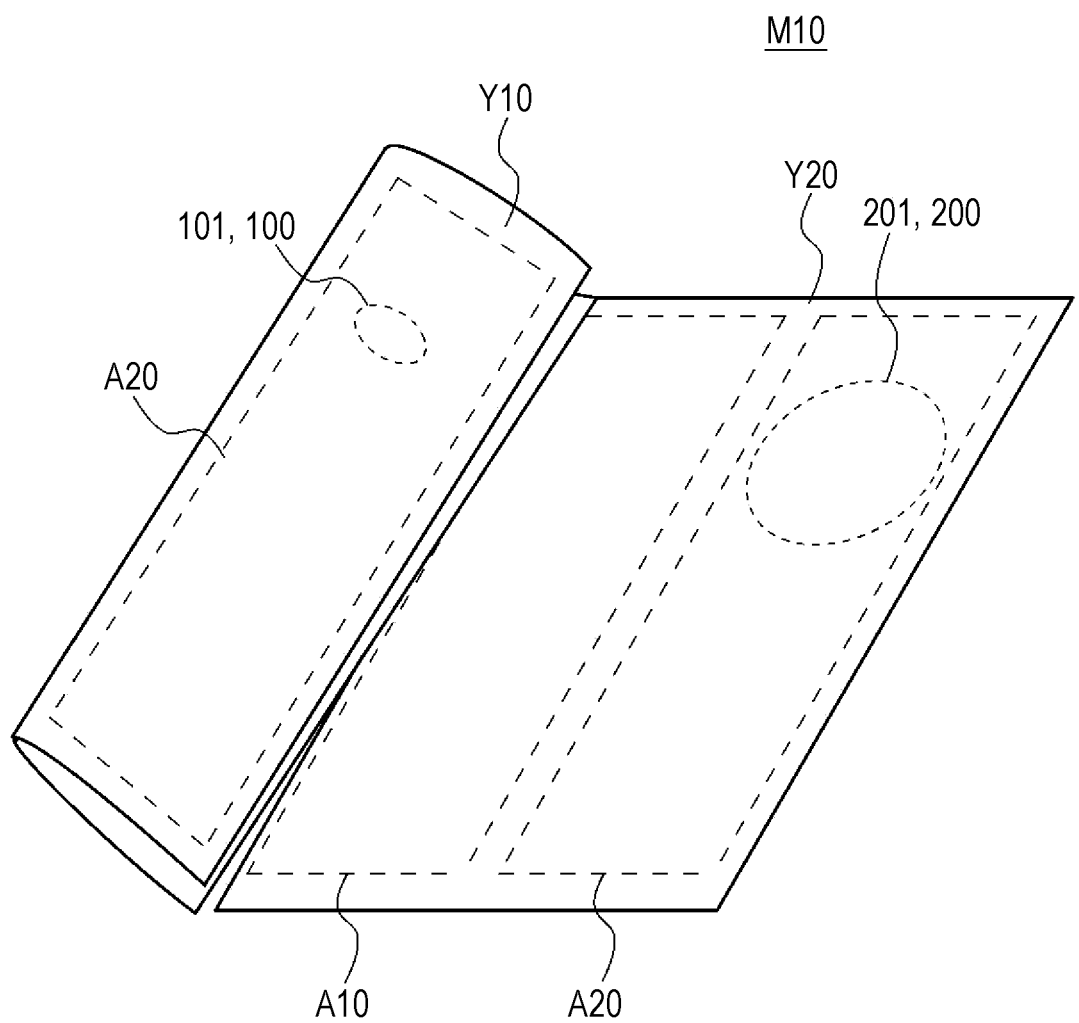
FIG. 16 is a view illustrating a state in which a first sheet of the printout in the state of FIG. 10 are folded right and left and mountain-folded near the center position, and right end parts of the first sheet are close to a left end part of a second sheet.

Alternatively, the right area A20 (refer to FIG. 16) of the front side of the sheet Y20 may be determined as the arrangement target area of the reference destination part 201. Even in this case, by folding the sheet Y10 in the same manner as in FIG. 15 (refer to FIG. 16), the user can simultaneously view the reference source part 101 arranged in the right area A20 of the front side of the sheet Y10 and the reference destination part 201 arranged in the right area A20 (FIG. 16) of the front side of the sheet Y20.

Alternatively, the left area A10 of the "back side" of the sheet Y20 may be determined as the arrangement target area of the reference destination part 201. In this case, by valley-folding the sheet Y20 in the printout MO in the state of FIG. 15 right and left near the center position C11 (refer to FIG. 17), the user can view the reference source part 101 arranged in the right area A20 of the front side of the sheet Y10 and the reference destination part 201 arranged in the left area A10 (FIG. 17) on the back side of the sheet Y20 at the same time.

Next, (3) when the reference source pan 100 is arranged in the left area A10 of the "back side" of the sheet Y10, the following operation is performed.

Specifically, when the reference source part 100 is arranged in the left area A10 of the "back side" of the sheet Y10, the process proceeds to steps S15A and S18A via steps S11 to S14.

Then, in step S18A, any one of four specific areas, that is, the left area A10 and the right area A20 of the "front side" of a sheet (for example, sheet Y20) different from the arrangement sheet Y10 of the reference source part 101 in the printout M10, and the left area A10 and the right area A20 of the "back side" of the sheet Y20, is determined as the arrangement target area of the reference destination part 201.

Figure 18:
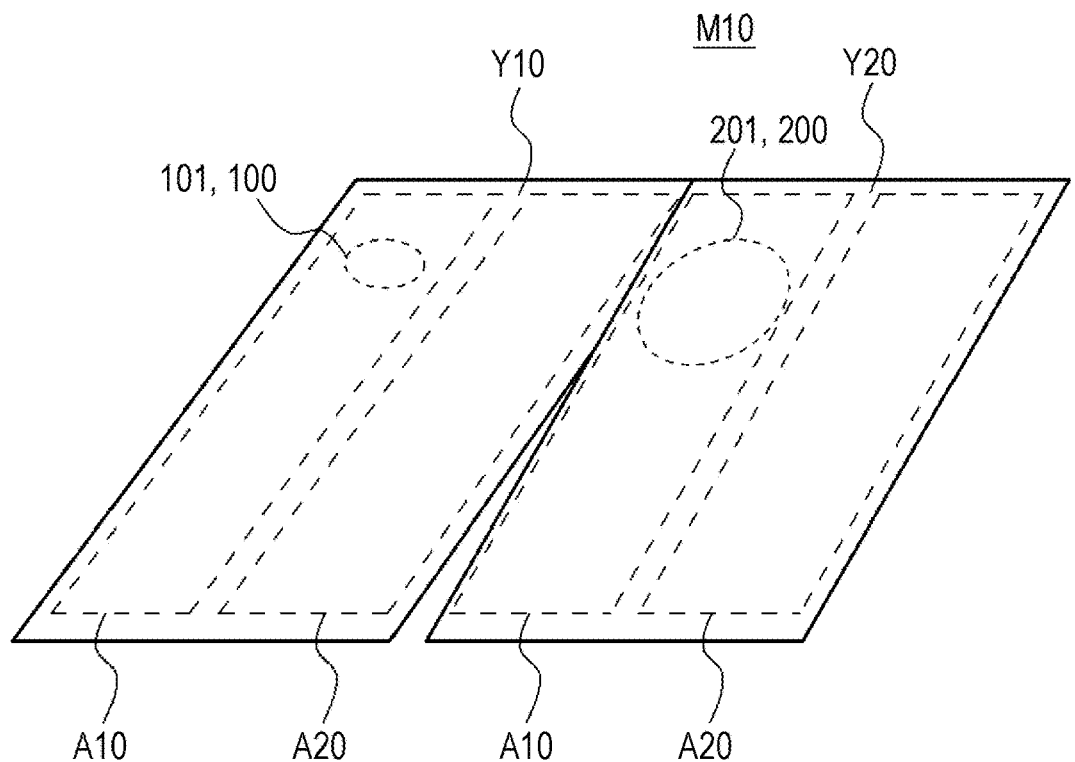
FIG. 18 is a view illustrating a state in which the entire first sheet of a printout in the state of FIG. 10 is turned over.

For example, the left area A10 (FIG. 18) of the "front side" of the sheet Y20 of the printout M10 is determined as the arrangement target area of the reference destination part 201. In this case, the user turns over the entire first sheet Y10 in the printout M10 of FIG. 10 and opens the back side of the sheet Y10 and the front side of the second sheet Y20 (refer to FIG. 18). In such a state, the user can view the reference source part 101 arranged in the left area A10 on the backside of the sheet Y10 and the reference destination part 201 arranged in left area A10 (FIG. 18) of the front side of the sheet Y20 at the same time.

Figure 19:
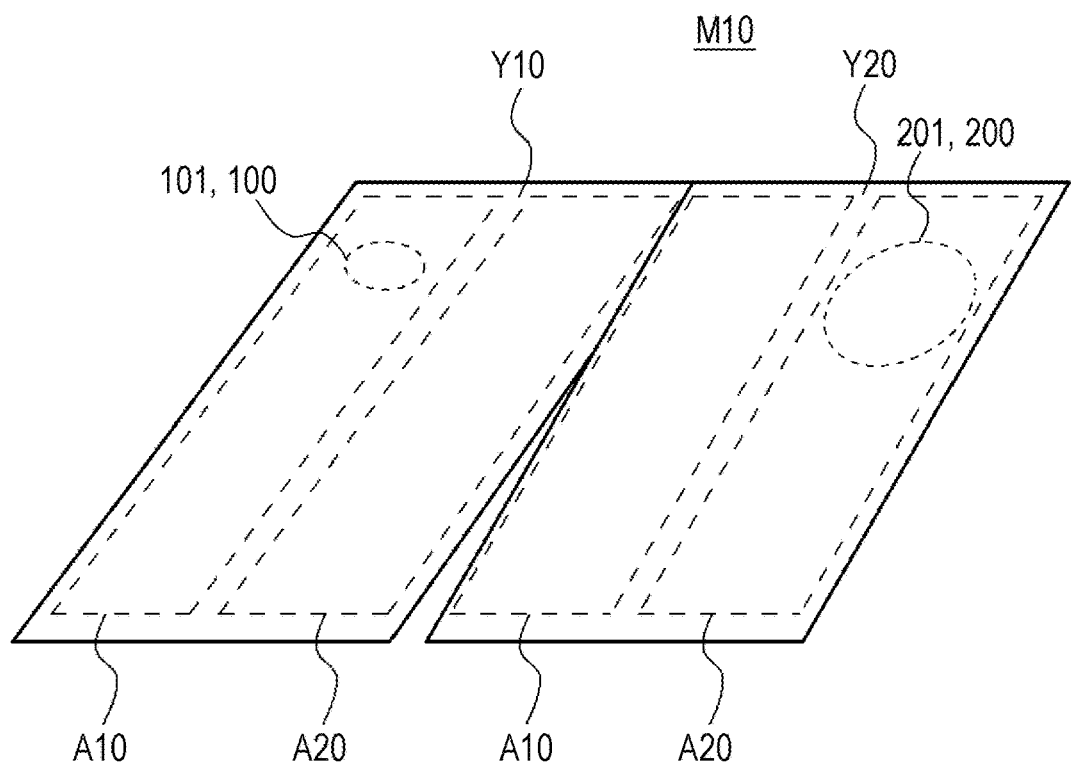
FIG. 19 is a view illustrating a state in which the entire first sheet of a printout in the state of FIG. 10 is turned over.

Alternatively, the right area A20 (FIG. 19) of the "front side" of the sheet Y20 of the printout M10 may be determined as the arrangement target area of the reference destination part 201. Even in this case, by opening the back side of the sheet Y10 and the front side of the sheet Y20 as in FIG. 18 (refer to FIG. 19), the user can view the reference source part 101 arranged in the left area A10 on the back side of the sheet Y10 and the reference destination part 201 arranged in the right area A20 (FIG. 19) of the front side of the sheet Y20 at the same time.

Figure 20:
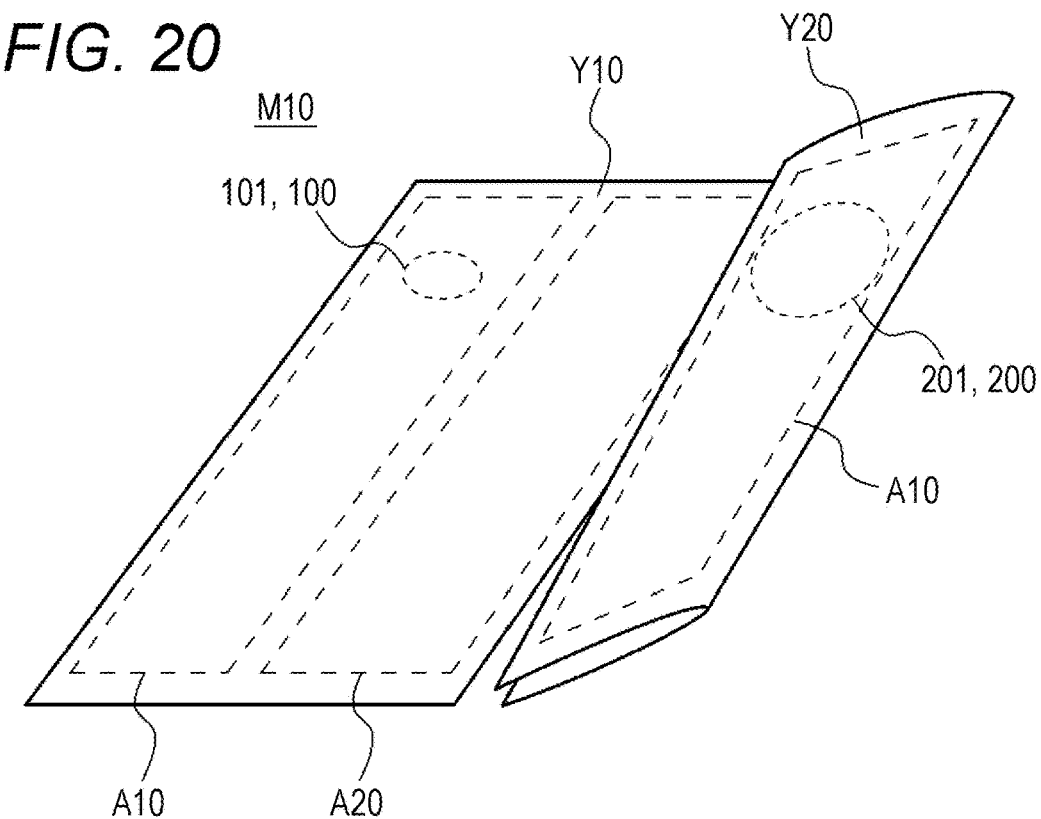
FIG. 20 is a view illustrating a state in which the second sheet of the printout in the state of FIG. 18 is folded right and left and valley-folded near the center position.

Alternatively, the left area A10 (FIG. 20) of the "back side" of the sheet Y20 of the printout M10 may be determined as the arrangement target area of the reference destination part 200. In this case, by valley-folding the sheet Y20 in the printout M10 in the state of FIG. 18 right and left near the center position C11 (refer to FIG. 20), the user can view the reference source part 101 arranged in the left area A10 of the back side of the sheet Y10 and the reference destination part 201 arranged in the left area A10 (FIG. 20) on the back side of the sheet Y20 at the same time.

Figure 21:
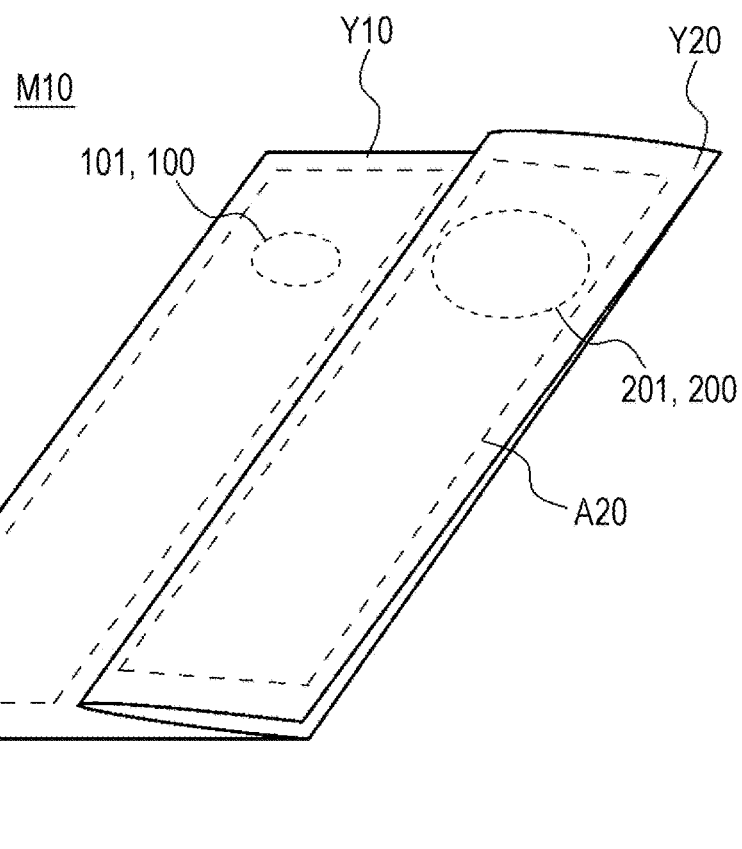
FIG. 21 is a view illustrating a state in which the left half of the front side of the second sheet is brought close to the right half of the back side of the first sheet in a printout in the state of FIG. 20.

Alternatively, the right area A20 (FIG. 21) of the "back side" of the sheet Y20 of the printout M10 may be determined as the arrangement target area of the reference destination part 200. In this case, by bringing the left half of the front side of the sheet Y20 in the printout M10 in the state of FIG. 20 close to the right half of the back side of the sheet Y10 (refer to FIG. 21), the user can view the reference source part 101 arranged in the left area A10 on the back side of the sheet Y10 and the reference destination part 201 arranged in the right area A20 (FIG. 21) on the back side of sheet Y20 at the same time.

Next, (4) when the reference source part 100 is arranged in the right area A20 of the "back side" of the sheet Y10, the following operation is performed.

Specifically, when the reference source part 100 is arranged in the right ara A20 of the "back side" of the sheet Y10, as in the case (3) where the reference source part 100 is arranged in the left area A10 of the "back side" of the sheet Y10, the process proceeds to steps S15A and S18A via steps S11 to S14.

Then in step S18A, any one of three specific areas, that is, the left area A10 and the right are A20 of the "front side" of the sheet (for example, sheet Y20) different from the arrangement sheet Y10 of the reference source part 101 in the printout M10, and the left area A10 of the "back side" of the sheet Y20, is determined as the arrangement target area of the reference destination part 201.

For example, the left area A10 (refer to FIG. 18) of the "front side" of the sheet Y20 of the printout M10 is determined as the arrangement target area of the reference destination part 201. In this case, the user turns over the entire sheet Y10 of the printout M10 to open the backside of the sheet Y10 and the front side of the sheet Y20 (also refer to FIG. 18). Thus, the user can view the reference source part 101 arranged in the right area A20 of the back side of the sheet Y10 and the reference destination part 201 arranged in the left area A10 (also refer to FIG. 18) on the front side of the sheet Y20 at the same time.

Alternatively, the right area A20 (also refer to FIG. 19) of the "front side" of the sheet Y20 of the printout M10 may be determined as the arrangement target area of the reference destination part 201. Even in this case, by opening the back side of the sheet Y10 and the front side of the sheet Y20 as in FIG. 18 (also refer to FIG. 19), the user can view the reference source part 101 arranged in the right ara A20 on the backside of the sheet Y10 and the reference destination part 201 arranged in the right area A20 (also refer to FIG. 19) of the front side of the sheet Y20 at the same time.

Alternatively, the left area A10 of the "back side" of the sheet Y20 of the printout M10 may be determined as the arrangement target area of the reference destination part 200. In this case, by valley-folding the sheet Y20 in the printout M10 in the state of FIG. 18 right and left near the center position C11 (also refer to FIG. 20), the user can view the reference source part 101 arranged in the right area A20 of the back side of the sheet Y10 and the reference destination part 201 arranged in the left area A10 on the back side of the sheet Y20 at the same time.

As described above, even when the print target document D10 is printed on both sides, the user can simultaneously view the reference source part 101 (100) and the reference destination part 201 (200) in the printout M10.

2. Second Embodiment

A second embodiment is a modification of the first embodiment. Hereinafter, the description will focus on the differences from the first embodiment.

In the second embodiment, an aspect in which a page aggregation function is used is exemplified.

Here, it is assumed that the setting item "page aggregation" (page allocation) is set to the setting value "2in1".

The operation of FIG. 4 is also performed in the second embodiment.

Specifically, in step S13 after steps S11 and S12, in the printout M10 (specifically, a virtual printout) obtained by printing out the print target document D10, it is determined whether the reference source part 101 and the reference destination part 201 corresponding to the reference source part 101 are arranged on different pages.

As described above, the reference source part 101 is described on the first page of the print target document D10 (refer to FIG. 6), and the reference destination part 201 is described on the third page of the print target document D10 (refer to FIG. 7). In addition, here, the setting is made to print out the print target document D10 in "one side" and "2in1".

In this case, in the printout M10 (virtual printout) obtained by printing out the print target document D10, it is determined that the reference source part 101 is arranged on the first page, and the reference destination part 201 is arranged on the second page. Then, it is determined in step S13 that the reference source part 101 and the reference destination part 201 are arranged on different pages, and the process proceeds from step S13 to step S14.

Figure 27:
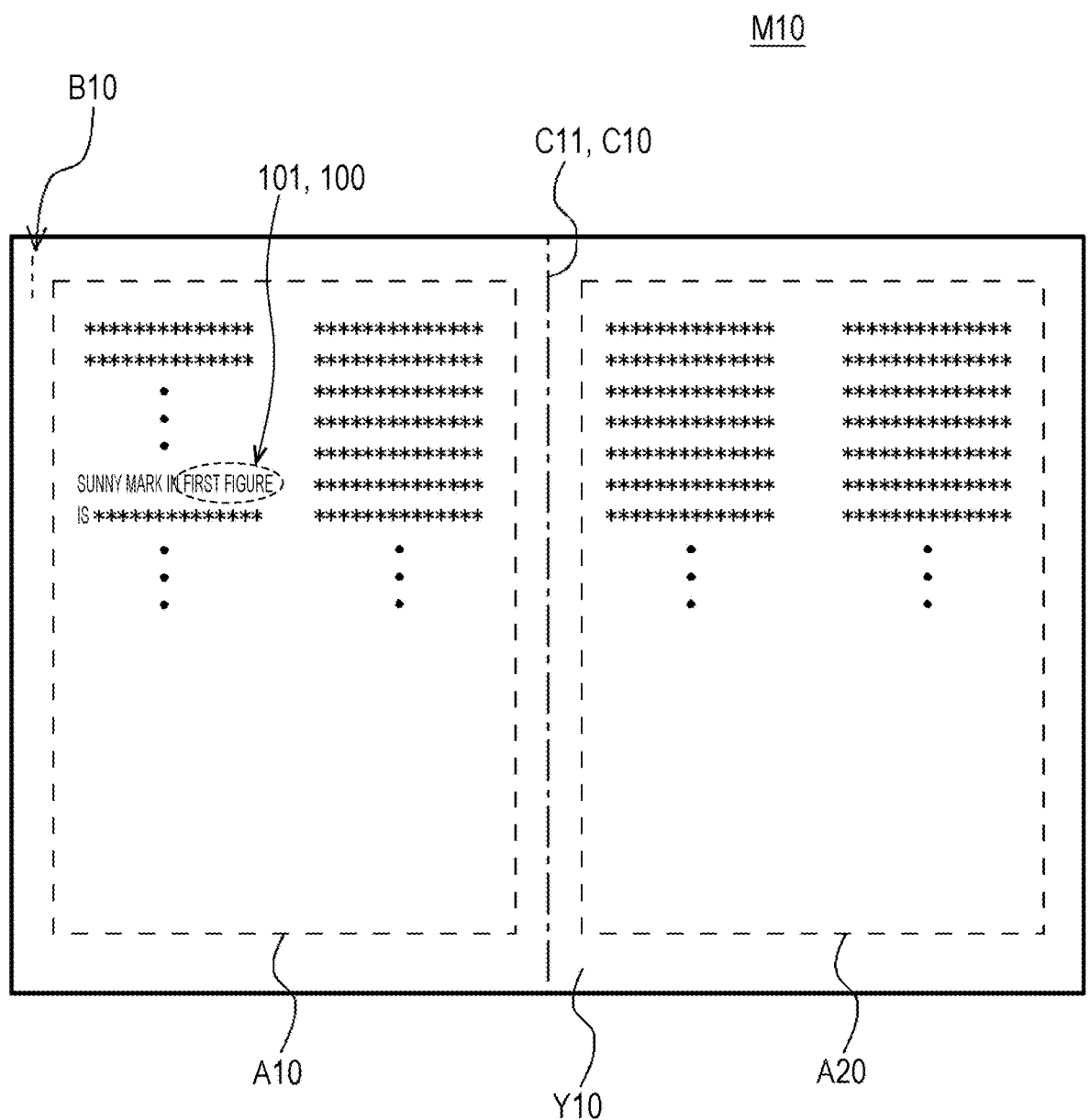
FIG. 27 is a view of a first page of a printout printed and output in "2in1"

In step S14, the computer 50 estimates the binding position B10 (refer to FIG. 27) in the printout M10 based on the setting contents of the setting item "binding direction" in the print job. Here, the setting item "binding direction" is set to the setting value "left binding", and the left end part (left side) of the sheet is estimated as the binding position B10 in the printout M10.

Then, in step S15A, the computer 50 determines whether or not the reference source part 101 is arranged on the front side of the sheet in the printout M10 based on the setting contents of the setting item "single-sided/double-sided" in the print job. Here, the setting item "single-sided/double-sided" is set to the set value "single-sided", it is determined in step S15A that the reference source part 101 in the printout M10 is arranged on the front side of the sheet. Then, the process proceeds from step S15A to step S16.

In step S16, the computer 50 determines whether or not the reference source part 100 is arranged in an area on the same side as the binding position B10 with respect to the reference position C10 (here, the center position C11) in a specific direction on the sheet surface in the entire area on the front side of the arrangement sheet (here, the first sheet Y10) of the reference source part 101.

Specifically, first, according to the setting contents of the setting item "binding direction" in the print job, the entire area on the front side of the arrangement sheet Y10 of the reference source part 100 is divided into two divided areas at the center position C11 in the specific direction on the sheet surface. Hem, the entire area on the front side of the arrangement sheet Y10 at the center position C11 in the left and right direction of the sheet is divided into two divided areas, the left area A10 (refer to FIG. 27) and the right area A20.

Then, it is determined whether or not the reference source part 101 is arranged in the area located on the same side as the binding position B10 with respect to the center position C11 in the left and right direction in two divided areas A10 and A20 on the front side of the arrangement sheet Y10 of the reference source part 101.

For example, when the binding position B10 is included in the left area A10 in the printout M10 and the reference source part 101 is arranged in the left area A10, it is determined in step S16 that the reference source part 101 is arranged in an area on the same side as the binding position B10 with respect to the reference position C10 in the left and right direction, and the process proceeds from step S16 to step S17A.

Then, in step S7A, the computer 50 determines an area (here right area A20) that is located on the opposite side to the binding position B10 with respect to the reference position C10 in a specific direction (here, left and right direction) in the entire area on the front side of the sheet different from the arrangement sheet Y10 of the reference source part 101, as the arrangement target area of the reference destination part 201.

Then, the operation in FIG. 4 ends, and the print job data is transmitted from the computer 50 to the MFP 10. Then, the print target document D10 is printed out, and the printout M10 (the changed printout M10) is discharged to a discharge tray.

Figure 28:
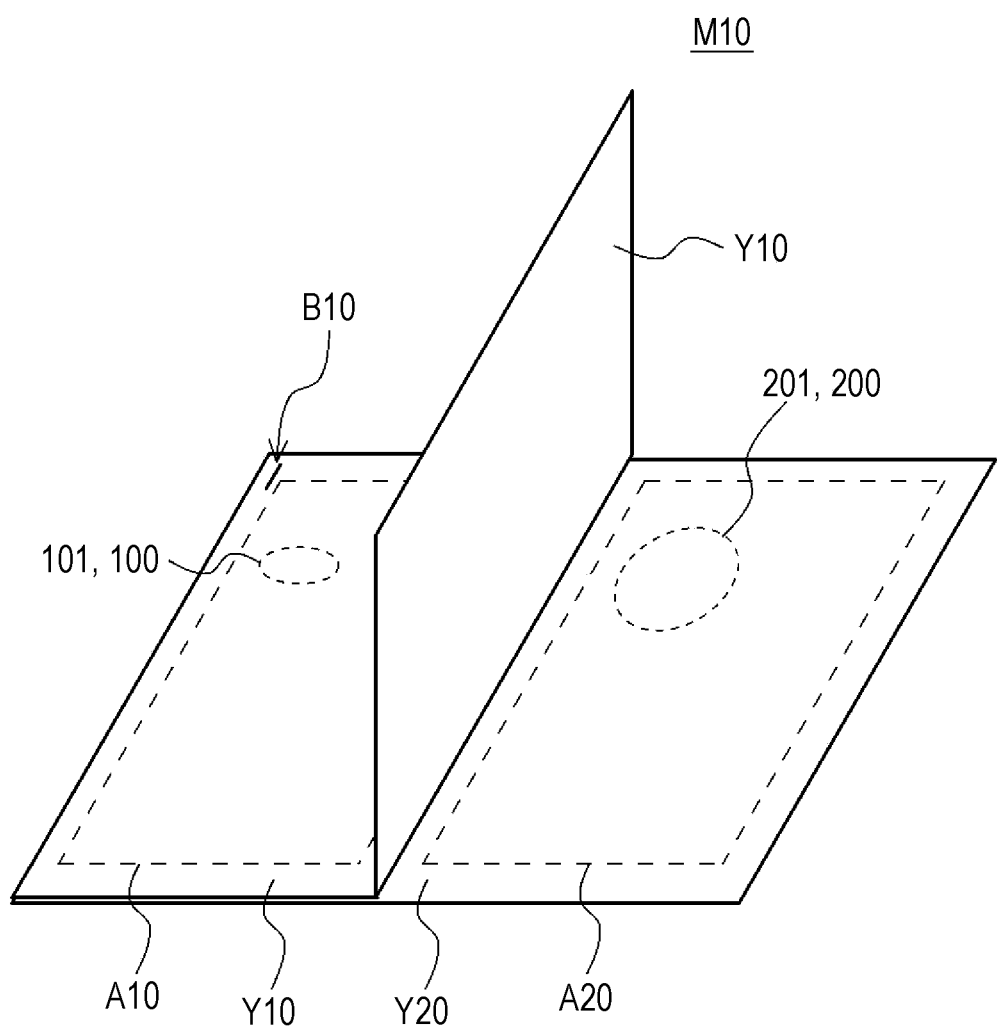
FIG. 28 is a view illustrating a state where right halves of the first sheet of a printout are turned up, and the right halves are standing in a substantially vertical direction.
Figure 29:
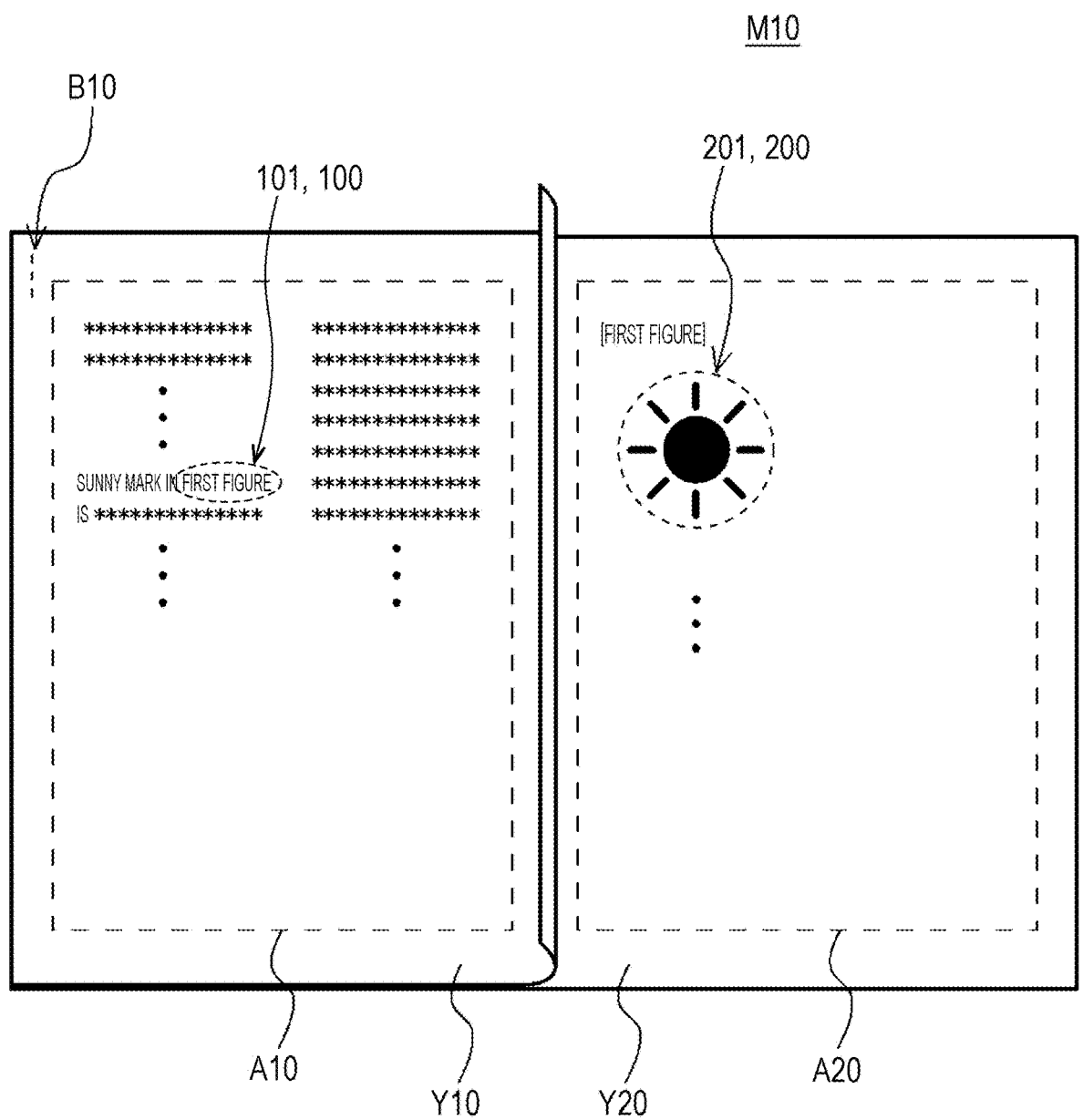
FIG. 29 is a view from a user looking down on a printout in the state of FIG. 28.

Thereafter, when the user reads the printout M10, the user turns up the right half of the sheet Y10 in the printout M10 to be in an upright state (refer to FIG. 28), such that the user can visually recognize the reference destination part 200 (the reference destination part 200 arranged in the right area A20 of the sheet Y20) that was not seen by the user due to the right half of the sheet Y10 (refer to FIG. 29). Therefore, the user can simultaneously see the reference source part 100 and the reference destination part 200 in the bound printout M10.

Note that, in the case where, of the arrangement sheet Y10 of the reference source part 101, the reference source part 101 is arranged in an area other than the left area A10 of the front side of the arrangement sheet Y10, as in the first embodiment, one of two to four specific areas on a sheet different from the arrangement sheet Y10 is determined as the arrangement target area of the reference destination part 201 (step S18A). Even in this case, similarly to the first embodiment (also refer to FIGS. 15 to 21 and the like), the user can simultaneously see the reference source part 101 and the reference destination part 201 in the bound printout M10.

3. Third Embodiment

A third embodiment is a modification of the first embodiment. Hereinafter, the description will focus on the differences from the first embodiment.

In the third embodiment, an aspect in which a booklet function is used is exemplified.

The booklet function is a function for creating a booklet by stacking and folding the printout M10 (a plurality of sheets) into two. When the booklet function is used, four pages of images are printed on the front and back of one sheet. A print job using the booklet function is also expressed as a booklet print job (also simply referred to as a booklet print job).

As described below, when the booklet function is used, the arrangement target area of the reference destination part 200 is determined using a reference different from that of the first embodiment.

Specifically, in the first embodiment, it is determined, in the printout M10, whether the reference source part 101 (100) is arranged on the "front side" of the arrangement sheet (for example, the sheet Y10) of the reference source part 101 (step S15A (FIG. 4)).

On the other hand, in the third embodiment, it is determined whether or not the arrangement page of the reference source part 101 (100) (the page on which the reference source part 101 is arranged) in the printout M10 is an "odd page" (step S15B (FIG. 31)).

Figure 30:
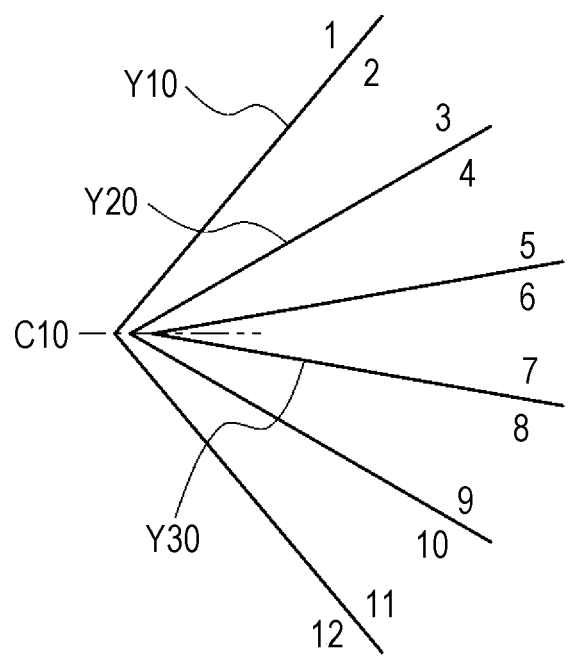
FIG. 30 is a view indicating page numbers arranged on each sheet when a booklet is created with three sheets.

Here, as illustrated in FIG. 30, if three sheets Y10, Y20, Y30 are folded in two to create a booklet, the "visual front side" of the printout M10 after the sheets are folded in two may be different from the "front side of the sheet". For example, as illustrated in FIG. 30, the eleventh page in the printout M10 after being folded in two is the apparent front side of the printout M10, but is not the "front side of the sheet itself" ("back side of the sheet Y10").

Figure 31:
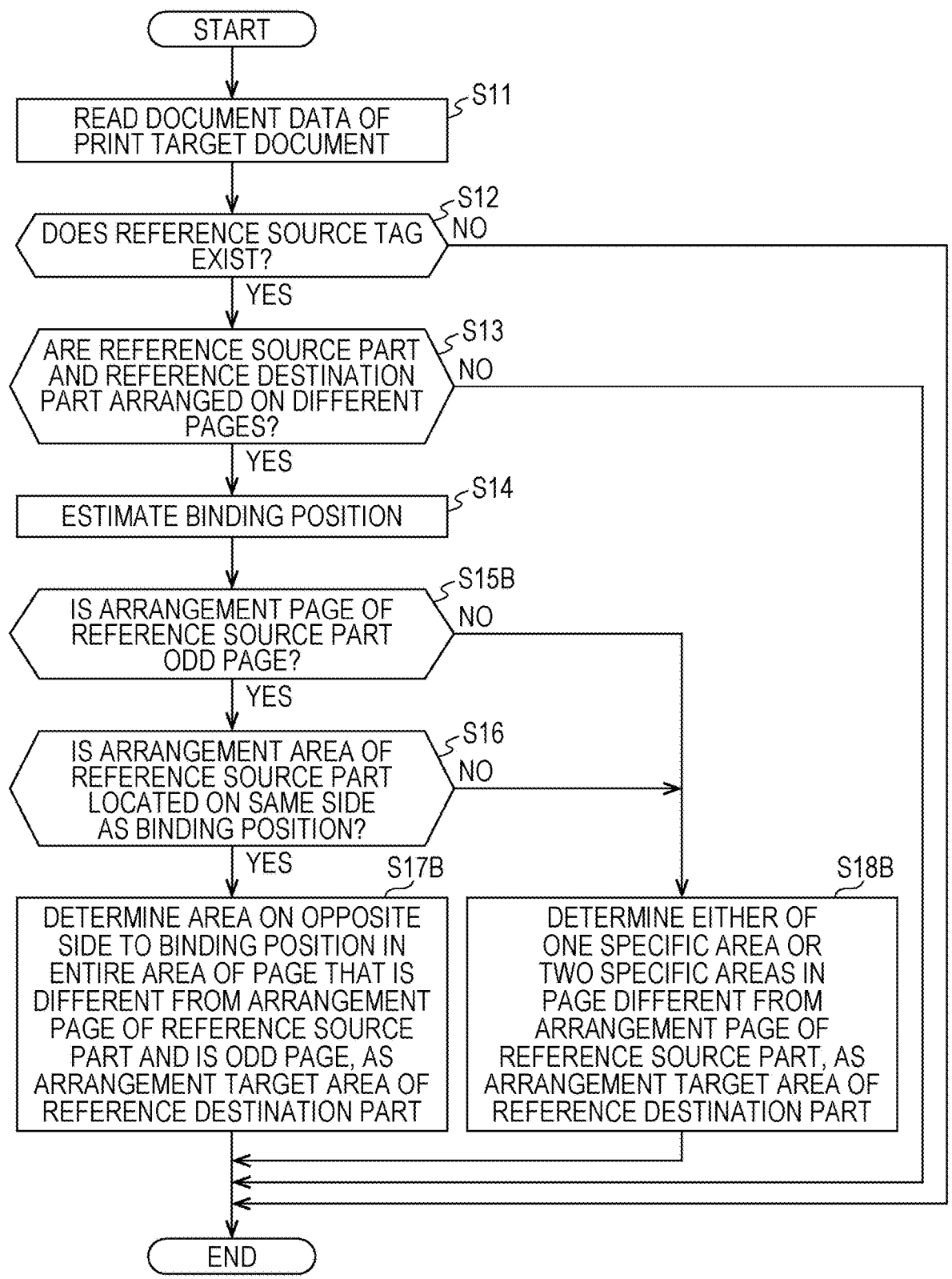
FIG. 31 is a flowchart of an operation of a computer according to a third embodiment (operation of determining an arrangement target area of a reference destination part)

When the printout M10 is folded in two, the odd-numbered pages in the printout M10 after being folded in two are always the front sides in appearance. Therefore, in the third embodiment (an aspect in which the booklet function is used), it is determined whether the arrangement page of the reference source part 101 in the printout M10 is an "odd page" (step S15B (FIG. 31)). In other words, it is determined whether or not the reference source part 101 is arranged on the apparent front side of the printout M10. FIG. 31 is a flowchart of the operation of the computer 50 (printer driver) according to the third embodiment (specifically, the operation of determining the arrangement target area of the reference destination part 200).

If it is determined that the arrangement page of the reference source part 101 is an odd page in the printout M10, the process proceeds from step S15B to step S16. Here, it is determined in step S15B that the reference source part 101 is arranged on the first page of the printout M10, and that the arrangement page of the reference source part 101 in the printout M10 is an odd page. Then, the process proceeds to step S16.

It is determined in step S16 whether or not, in the entire area of the arrangement page (here, the first page) of the reference source part 101, the reference source part 101 is arranged in an area located on the same side as the binding position B10 with respect to the reference position C10 in a specific direction.

Figure 8:
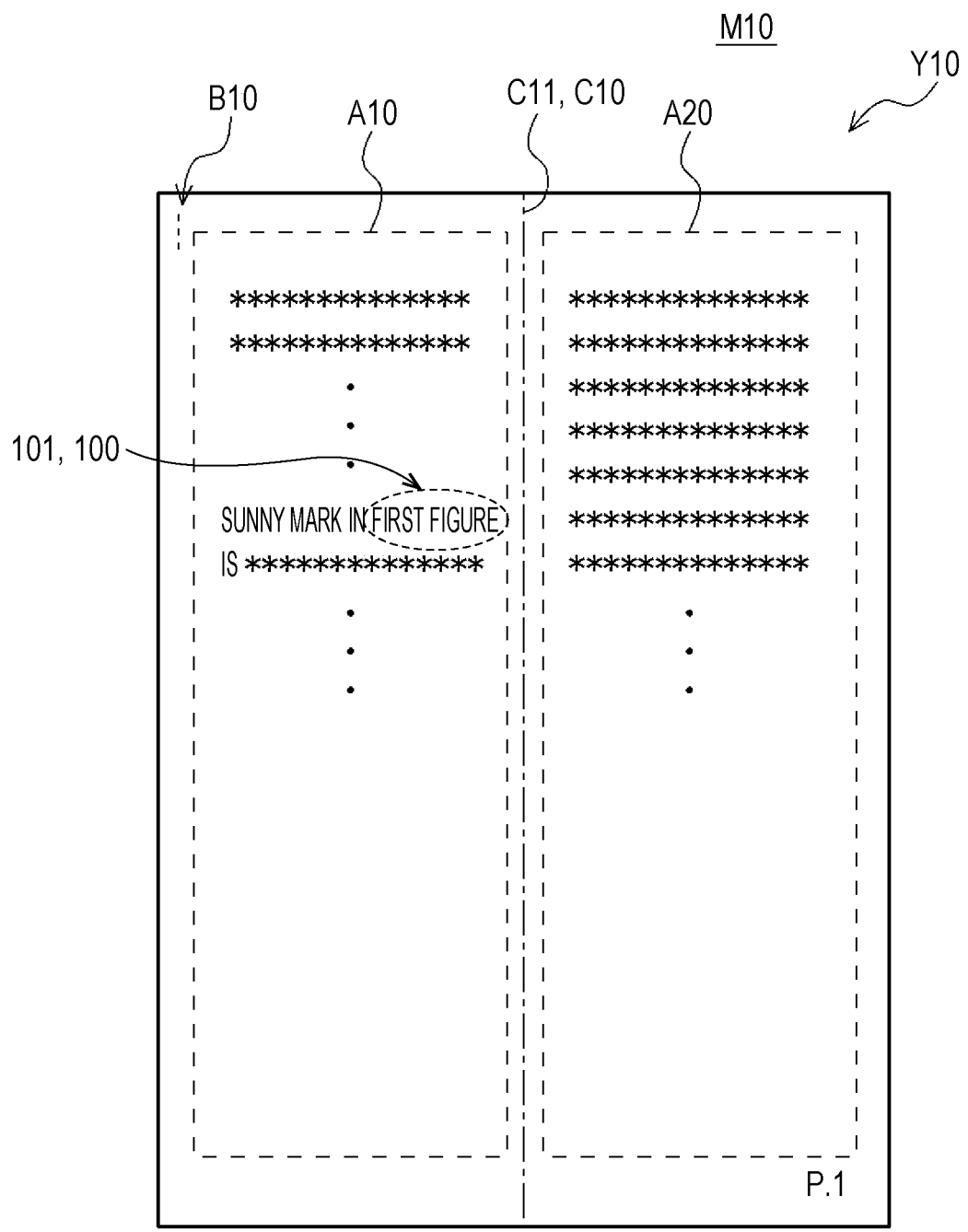
FIG. 8 is a view of a first page of a printout.
Figure 9:
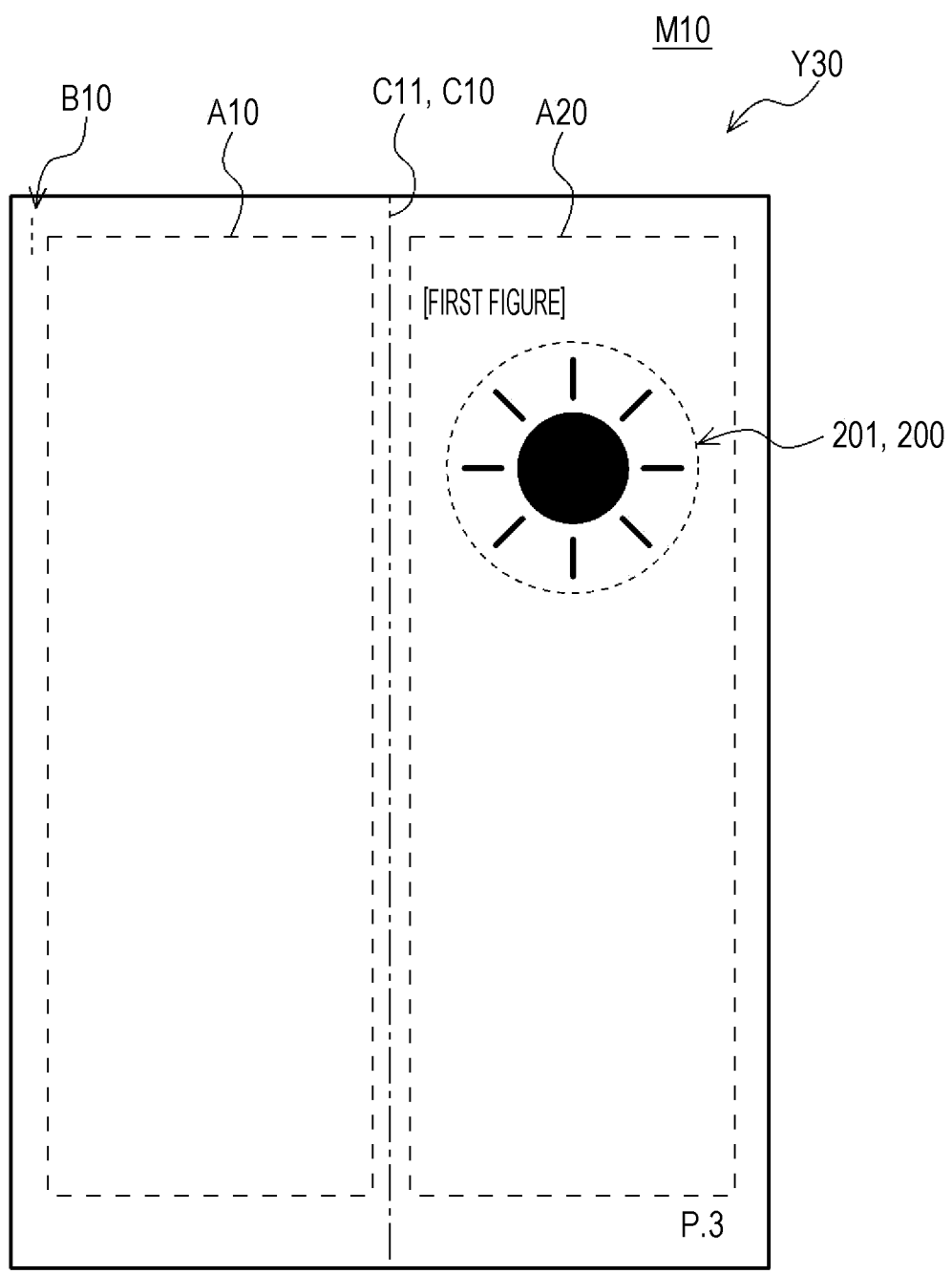
FIG. 9 is a view of a third page of a printout.

For example, when the setting contents of the setting item "binding direction" is set to the setting value "left binding", the entire area of the arrangement page of the reference source part 101 is divided into two divided areas, a left area A10 and a right area A20, at a center position C11 in the left and right direction of the page (refer to also FIG. 8). Then, it is determined whether or not the reference source part 101 is arranged in the left area A10 (an area existing on the same side as the binding position B10 with respect to the reference position C10 in the left and right direction) of the two divided areas A10 and A20 in the arrangement page of the reference source part 101.

When the reference source part 101 is placed in the left area A10 of the arrangement page (here, the first page) of the reference source part 101, the process proceeds from step S16 to step S7B. Then, in step S17B, the computer 50 determines an area (here, the right area A20) located on the opposite side to the binding position B10 with respect to the reference position C10 in a specific direction (here, left and right direction) in the entire area of an odd page (for example, third page) different from the arrangement page (first page) of the reference source part 101, as the arrangement target area of the reference destination part 201.

Specifically, the entire area of the third page is divided into two divided areas of the left area A10 and the right area A20 at the reference position C10 (here, the center position C11) in the left and right direction. Then, the right area A20 (area located on the opposite side to the binding position B10 with respect to the reference position C10 in the left and right direction) of the left area A10 and the right area A20 of the third page is determined as the arrangement target area of the reference destination part 201.

Now that the subsequent operation is the same as in the first embodiment.

Specifically, when the user turns up the right halves of the first and second pages in the printout M10 to be in an upright state (refer to also FIG. 11), the user can visually recognize the reference destination part 201 (reference destination part 201 arranged in the right area A20 of the third page) that was not seen by the user due to the right halves of the first and second pages (refer to also FIG. 12). Therefore, the user can simultaneously see the reference source part 101 and the reference destination part 201 in the bound printout M10.

Note that, when the reference source part 101 is arranged in an area (specifically, the right area A20) other than the left area A10 of the arrangement page (here, the first page) of the reference source part 101, the process proceeds from step S16 to step S18B.

In step S18B, either one specific area or two specific areas in a page different from the arrangement page of the reference source part 100 in the printout M10 (excluding the pages behind the arrangement page of the reference source part 100) is determined as the arrangement target area of the reference destination part 201.

Figure 13:
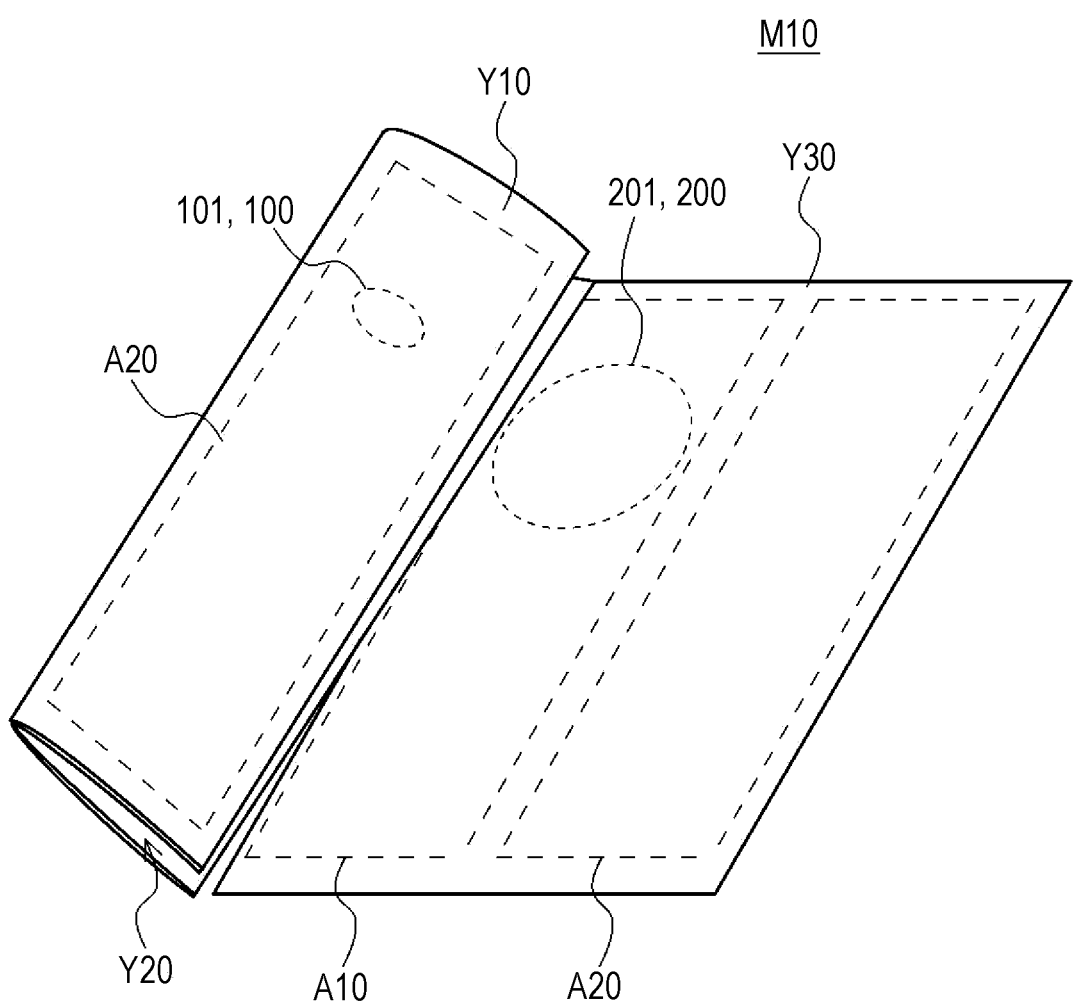
FIG. 13 is a view illustrating a state in which first and second sheets of the printout in the state of FIG. 10 are folded right and left and mountain-folded near the center position, and right end parts of the first and second sheets are brought close to a left end part of a third sheet.
Figure 14:
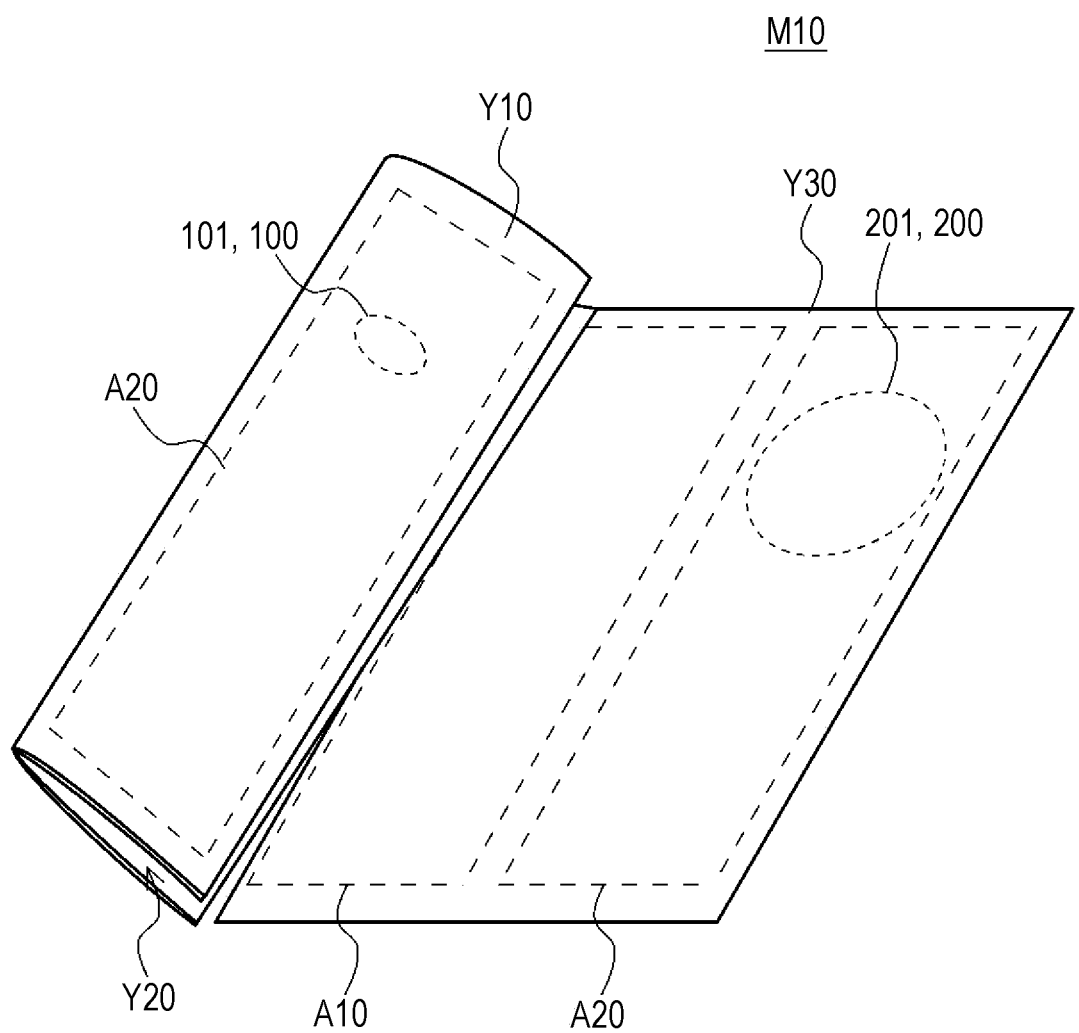
FIG. 14 is a view illustrating a state in which first and second sheets of the printout in the state of FIG. 10 are folded right and left and mountain-folded near the center position, and right end parts of the first and second sheets are brought close to a left end part of a third sheet.

For example, when the reference source part 100 is arranged in the right area A20 of the first page of the printout M10, one of the two specific areas, the left area A10 and the right area A20, of the third page of the printout M10 is determined as the arrangement target area of the reference destination part 201. In this case, the user can simultaneously see the reference source part 101 and the reference destination part 201 by folding the first page of the printout M10 as illustrated in FIG. 13.

Figure 17:
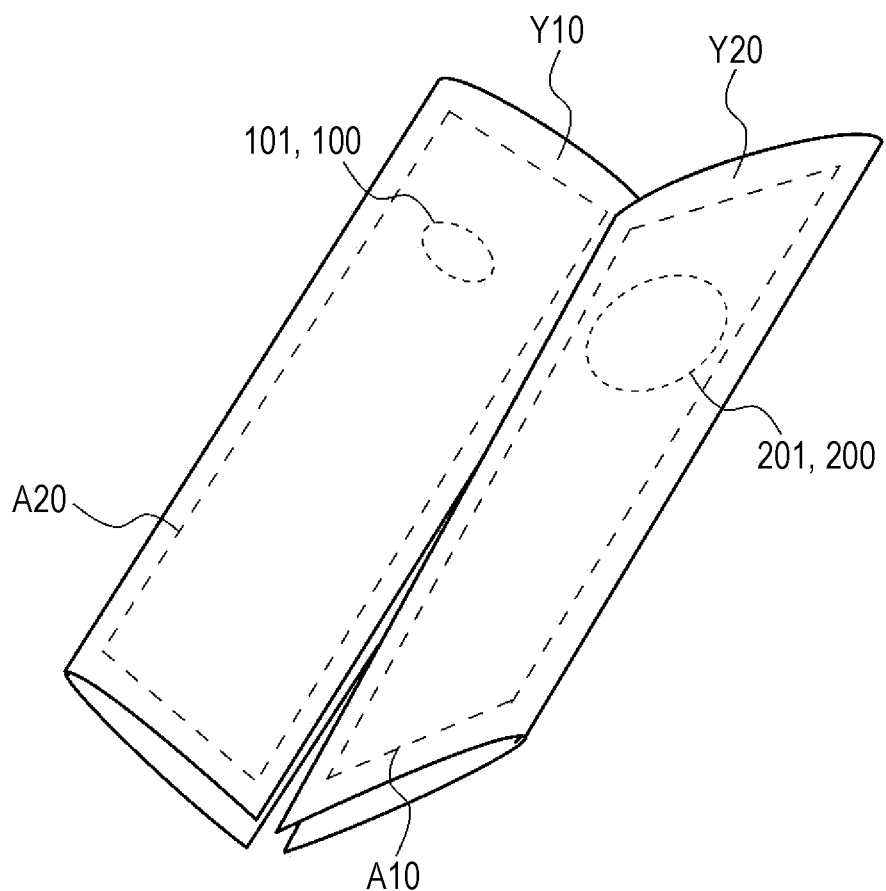
FIG. 17 is a view illustrating a state in which the third sheet of the printout in the state of FIG. 15 is folded right and left and valley-folded near the center position.

Alternatively, when the reference source part 100 is arranged in the right area A20 of the first page of the printout M10, the left area A10 of the fourth page of the printout M10 may be determined as the arrangement target area of the reference destination part 201. In this case, the user can see the reference source part 101 and the reference destination part 201 at the same time by folding the first and fourth pages of the printout M10 as illustrated in FIG. 17.

4. Fourth Embodiment

A fourth embodiment is a modification of the first embodiment. Hereinafter, the description will focus on the differences from the first embodiment.

The first embodiment exemplifies an aspect in which one reference source part 100 (only the reference source part 101) is disposed in the left area A10 of the front side of the arrangement sheet Y10 of the reference source part 101 (FIG. 8).

Figure 32:
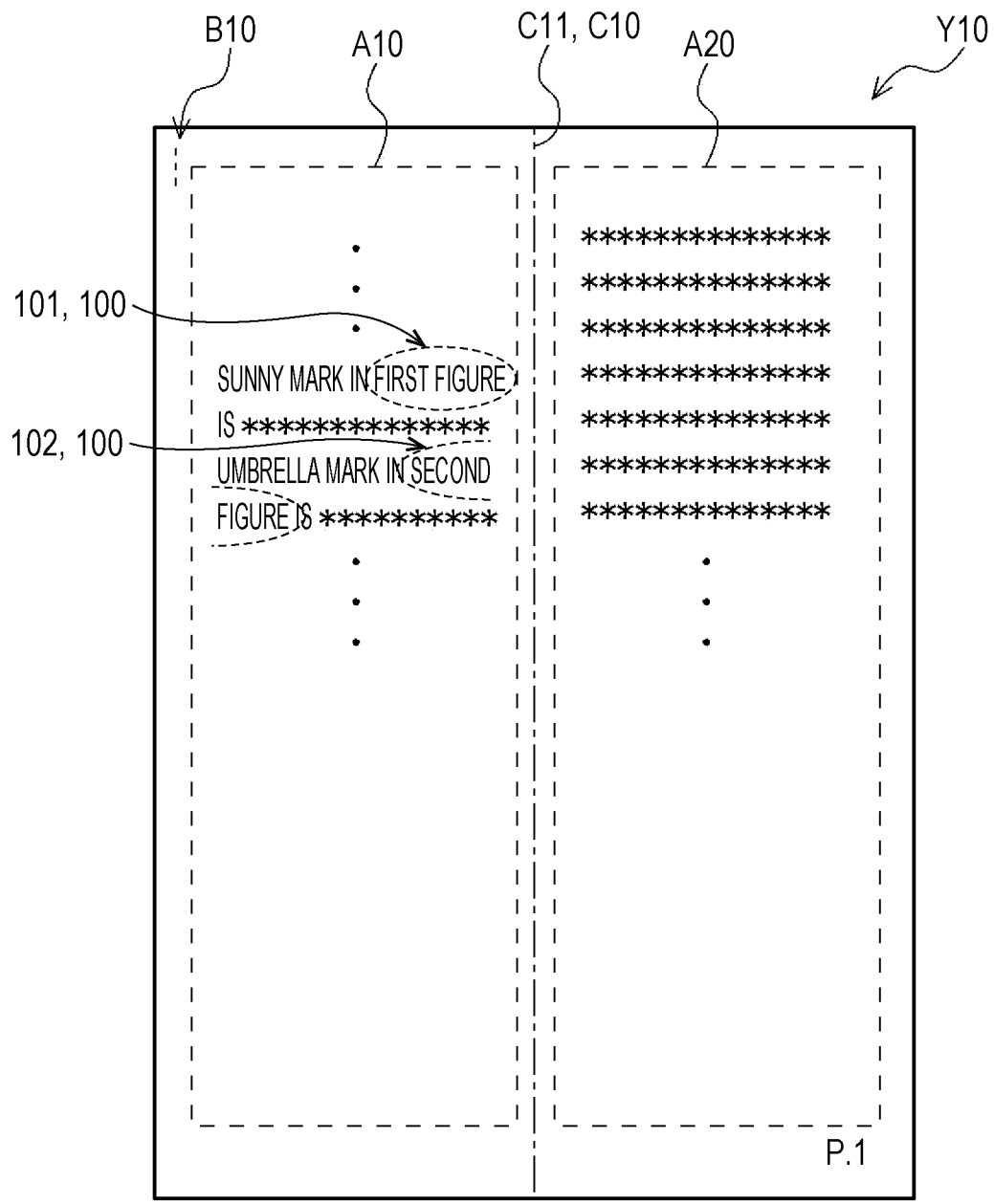
FIG. 32 is a view of a first page of a printout according to a modification.

On the other hand, the fourth embodiment exemplifies an aspect in which a plurality of different reference source parts 100 are arranged in the left area A10 (refer to FIG. 32).

In FIG. 32, in the left area A10 of the front side of the arrangement sheet Y10 of the reference source part 101, not only the reference source part 101 (reference source text "first figure") but also another reference source part 102 (reference source text "second figure") are arranged.

In this case, the right area A20 of the front side of the sheet (for example, the third sheet Y30) common to the two reference destination pans 200 (201, 202) corresponding to the two reference source parts 100 (101, 102) (FIG. 33) is determined as the arrangement target area of each of the two reference destination parts 200 (step S17A).

Figure 33:
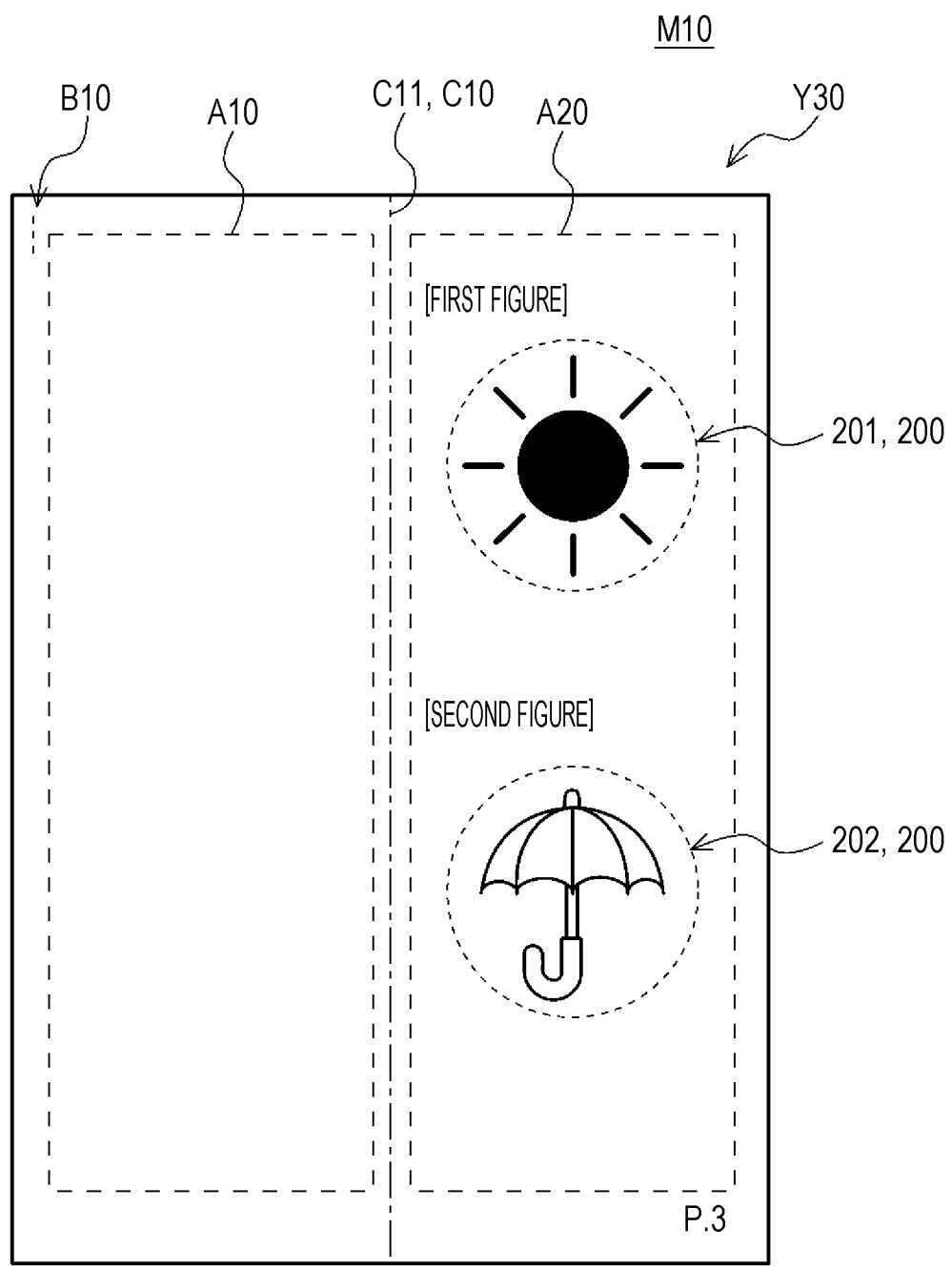
FIG. 33 is a view of a third page of the printout according to the modification.

Specifically, when the sheet Y30 is divided into two divided areas of the left area A10 and the right area A20 at the reference position C10 in the left and right direction, the two reference destination parts 201 and 202 are arranged (aligned) in the up and down direction in the right area A20 of the front side of the sheet Y30 (refer to FIG. 33).

More specifically, the two reference destination parts 201 and 202 in the right area A20 are arranged at positions corresponding to the order of appearance of the reference source parts 100 corresponding to the two reference destination parts 201 and 202 in the left area A10. Here, in the left area A10, two reference source parts 101 and 102 appear in this order. In this case, the two reference destination parts 201 and 202 in the right area A20 are arranged in this order (the order in which the reference source parts 101 and 102 appear in the left area A10) from top to bottom (refer to FIG. 33). Specifically, in the right area A20 of the front side of the sheet Y30, the reference destination part 201 is disposed above the reference destination part 202.

When the sheet is divided into two divided areas of the upper area A30 and the lower area A40 at the reference position C10 in the up and down direction (refer to FIG. 24), the two reference destination parts 201 and 202 are arranged in the left and right direction in the lower area A40. In this case, based on the appearance order of the reference source parts 101 and 102 in the left area A10, the reference destination part 201 is arranged on the left side of the reference destination part 202 in the lower area A40.

As described above, in the fourth embodiment, for example, when a plurality of the reference source parts 101 and 102 is arranged in the left area A10 of the front side of the sheet Y10, the right area A20 of the sheet (for example, the sheet Y30) different from the sheet Y10 and common to the reference destination parts 201 and 202 corresponding to the reference source parts 101 and 102 is determined as an arrangement target area of each of a plurality of the reference destination parts 201 and 202.

Here, when a plurality of the reference destination parts 201 and 202 is arranged in the right area A20 of the front side of different sheets (non-common sheets), the user needs a page turning operation when referring to each reference destination part 200. Specifically, for example, while the reference destination part 201 is arranged in the right area A20 of the front side of the sheet Y30, and the reference destination part 202 is arranged in the right area A20 of the front side of a sheet different from the sheet Y30 (for example, a sheet next to the sheet Y30), the user needs to turn over a part of the sheet Y30 when referring to the reference destination part 202 next to the reference destination part 201 (specifically, the part of the sheet Y30 up to the reference position C10 in the left and right direction).

On the other hand, in the fourth embodiment, when a plurality of the reference source parts 101 and 102 is arranged in the left area A10 of the front side of the sheet Y10, the right area A20 of the sheet (for example, the third sheet Y30) common to a plurality of the reference destination parts 201 and 202 corresponding to a plurality of the reference source parts 101 and 102 is determined as the arrangement target area of each of the reference destination parts 201 and 202. Therefore, even if the user refers to the reference destination part 202 after referencing the reference destination part 201 arranged in the right area A20 of the front side of the sheet Y30, for example, the user can refer to the reference destination part 202 in the right area A20 of the front side of the sheet Y30 without turning over apart of the sheet Y30. In other words, the user can refer to the reference destination parts 201 and 202 corresponding to the reference source parts 101 and 102 in the right area A20 on the front side of the same sheet (here, sheet Y30). Therefore, it is possible to suppress the number of times a user turns pages when referring to each reference destination part 200 (to suppress the user's page turning operation).

Here, the fourth embodiment is exemplified as a modification of the first embodiment, but is not limited thereto, and the idea of the fourth embodiment may be applied to other embodiments.

For example, the idea of the fourth embodiment may be applied to the third embodiment.

Specifically, when a plurality of the reference source parts 101 and 102 are arranged in the left area A10 of the arrangement page of the reference source part 101 in the printout M10 (for example, refer to FIGS. 30 and 32), a page different from the arrangement page (odd page), that is pages common to a plurality of the reference destination parts 201 and 202 corresponding to a plurality of the reference source parts 101 and 102 may be determined as an arrangement target area of each of a plurality of the reference destination parts 201 and 202.

In this case, the user can refer to the reference destination parts 201 and 202 corresponding to the reference source parts 101 and 102 in the right area A20 of the same page. Therefore, it is possible to suppress a user's page turning operation.

Further, in the fourth embodiment, the appearance order of a plurality of the reference destination parts 200 in the right area A20 of the sheet common to a plurality of the reference destination parts 200 (for example, sheet Y30) is determined based on the order of appearance of the reference source parts 100 corresponding to each of a plurality of the reference destination parts 200 (the order of appearance in the left area A10 of the sheet Y10) (refer also to FIG. 33), but the fourth embodiment is not limited thereto.

For example, the appearance order of each of a plurality of the reference destination parts 200 in the right area A20 of the sheet (sheet Y30) common to a plurality of the reference destination part 200 may be determined based on the number of appearances of the reference source part 100 corresponding to each of a plurality of the reference destination parts 200 (the number of appearances in the left area A10 of the sheet Y10).

Figure 34:
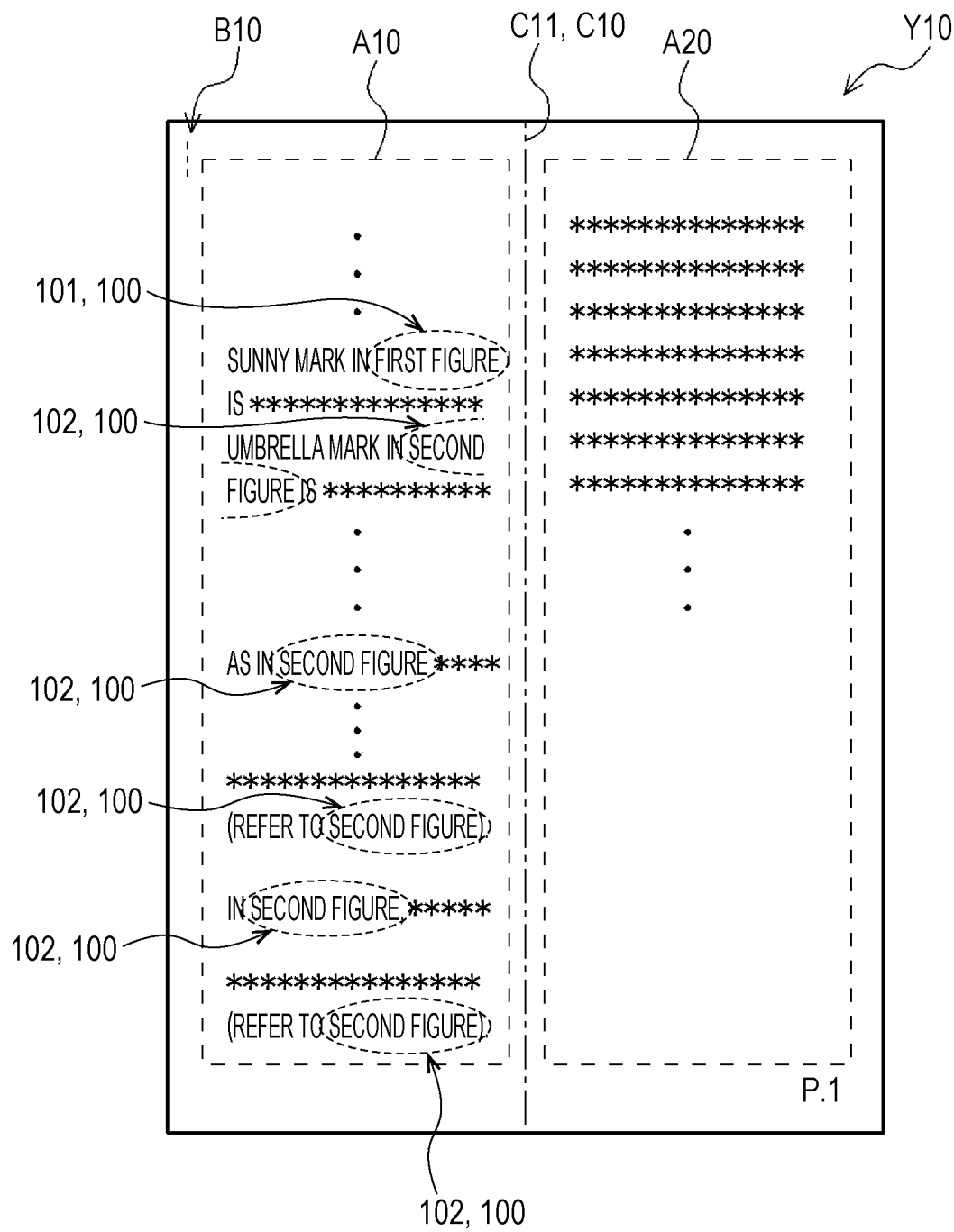
FIG. 34 is a view of a first page of the printout according to a modification.

Here, it is assumed that in the left area A10 of the front side of the sheet Y10, the reference source part 101 (100) appears once and the reference source part 102 (100) appears five times (refer to FIG. 34).

Figure 35:
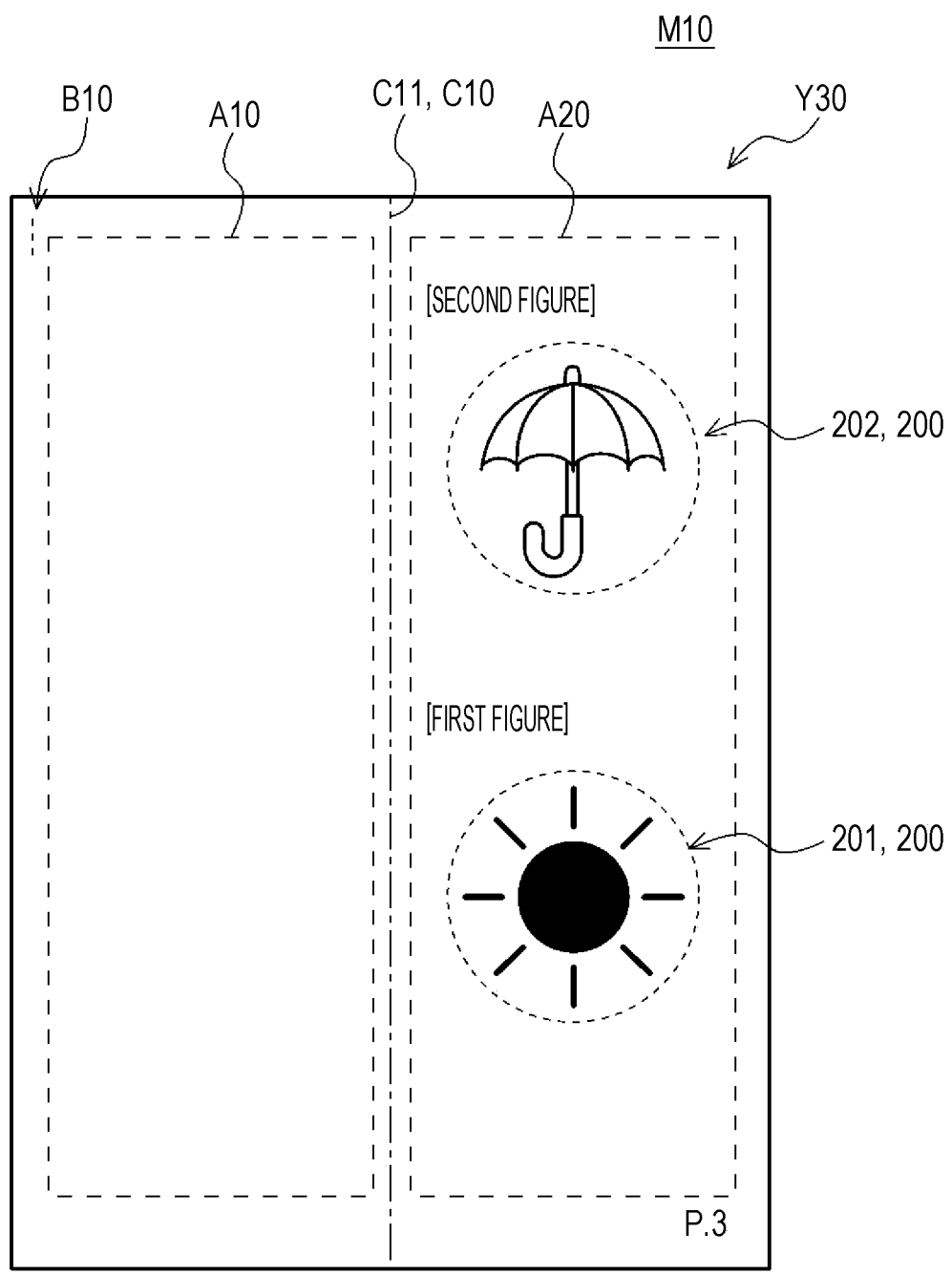
FIG. 35 is a view of a third page of the printout according to the modification.

In this case, of a plurality of the reference destination parts 201 and 202, the arrangement position (appearance order) of the reference destination part 200 (here, reference destination part 202) with the largest number of appearances of the corresponding reference source part 100 (number of appearances in the left area A10 of the front side of the sheet Y10) is determined to be the uppermost position (first appearance order) in the right area A20 of the front side of the sheet Y30 (refer to FIG. 35). Further, among a plurality of the reference destination parts 201 and 202, the arrangement position (appearance order) of the reference destination part 200 (here, the reference destination part 201) having the second largest number of appearances of the corresponding reference source part 100 (the number of appearances in the left area A10 of the front side of the sheet Y10) is determined at the position (second appearance order) below (one below) the reference destination part 202 in the right area A20 of the front side of the sheet Y30.

As described above, in the right area A20 of the front side of the sheet Y30, in the descending order of the number of appearances (number of appearances in the left area A10 of sheet Y10) of the corresponding reference source part 100 (here, in the order of the reference destination parts 202 and 201), a plurality of the reference destination parts 201 and 202 may be arranged from the upper side to the lower side in the up and down direction (refer to FIG. 35).

Here, when a plurality of the reference destination parts 200 is arranged in the up and down direction, the user often looks at a plurality of the reference destination parts 200 sequentially from the upper reference destination part 200 to search for a desired reference destination pan 200.

Therefore, among a plurality of the reference destination parts 200 arranged in the up and down direction, the reference destination part 200 arranged on the upper side is more noticeable to the user than the reference destination part 200 arranged on the lower side. In other words, the user can find the reference destination part 200 arranged on the upper side of a plurality of the reference destination parts 200 arranged in the up and down direction more easily than the reference destination part 200 arranged below.

In the modification in the right area A20 of the front side of the sheet Y30, in the descending order of the number of appearances (number of appearances in the left area A10 of the sheet Y10) of the corresponding reference source part 100 (here, in the order of the reference destination parts 202 and 201), a plurality of the reference destination parts 201 and 202 is arranged from the upper side to the lower side in the up and down direction. In other words, as the reference destination part 200 has a larger number of times of reference, it is arranged at a position more noticeable to the user. Therefore, when referring to the reference destination part 200 corresponding to the reference source part 100 that frequently appears in the left area A10 of the sheet Y10 in the right area A20, the user can easily find the reference destination part 200 in the right area A20.

When a plurality of the reference destination parts 200 (201, 202) is arranged in the left and right direction, for example, a plurality of the reference destination parts 201 and 202 may be arranged from the left side in the left and right direction to the right side in descending order (here, in the order of the reference destination part 202, 201) of the number of appearances (number of appearances in the arrangement area of the sheet Y10) of the corresponding reference source part 100.

5. Modifications and Others

The embodiments of the present invention have been described above, but the present invention is not limited to the above-described contents.

For example, in each of the above-described embodiments and the like, an aspect in which the setting item "binding direction" is set to the setting value "left binding" is mainly exemplified. However, the embodiments are not limited thereto, and the setting item "binding direction" may be set to the setting value other than the setting value "left binding".

Specifically, the setting item "binding direction" may be set to the setting value "right binding", or the setting item "binding direction" may be set to the setting value "top binding".

For example, when the setting item "binding direction" is set to the setting value "top binding", the following operation is performed. Here, it is assumed that the setting item "single-sided/double-sided" is set to the set value "double-sided".

As described above, when the setting contents of the setting item "binding direction" is the set value "top binding", the entire area on the front side of the arrangement sheet Y10 for the reference source part 101 (100) is divided into two divided areas of the upper area A30 (refer to FIG. 22) and the lower area A40 at the center position C12 in the up and down direction (reference position C10). The upper area A30 is an area located on the same side as the binding position B10 with respect to the reference position C10 in the up and down direction, and the lower area A40 is an area located on the opposite side to the binding position B10 with respect to the reference position C10 in the up and down direction.

For example, when the reference source part 101 is arranged in the upper area A30 on the front side of the arrangement sheet of the reference source part 101 (for example, the first sheet Y10), in the printout M10, the lower area A40 of the front side of a sheet (for example, third sheet Y30) different from the arrangement sheet Y10 of the reference source part 101 (refer to FIG. 24) is determined as the arrangement target area of the reference destination part 201 (200) (step S17A (FIG. 4)).

Specifically, first, the entire area on the front side of a sheet (for example, the third sheet Y30) different from the arrangement sheet Y10 of the reference source part 101 in the printout M10 is divided into two divided areas of the upper area A30 and the lower area A40 at the reference position C10 in the up and down direction. Then, the lower area A40 on the front side of the sheet Y30 (area located on the opposite side to the binding position B10 with respect to the reference position C10 in the up and down direction) (refer also to FIG. 24) is determined as the arrangement target area of the reference destination part 201.

Figure 23:
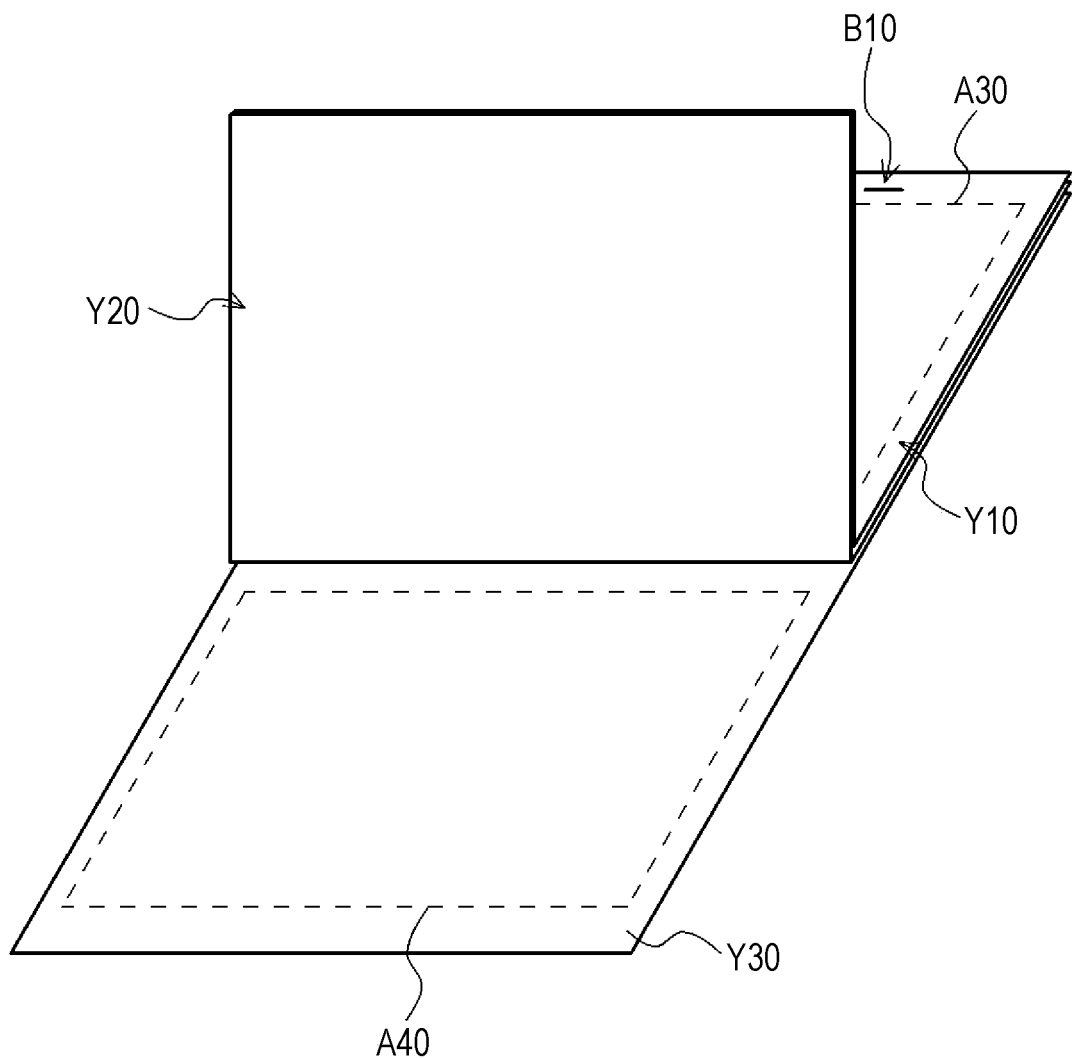
FIG. 23 is a view illustrating a state where lower halves of first and second sheets of a printout are turned up, and the lower halves are standing in a substantially vertical direction.
Figure 24:
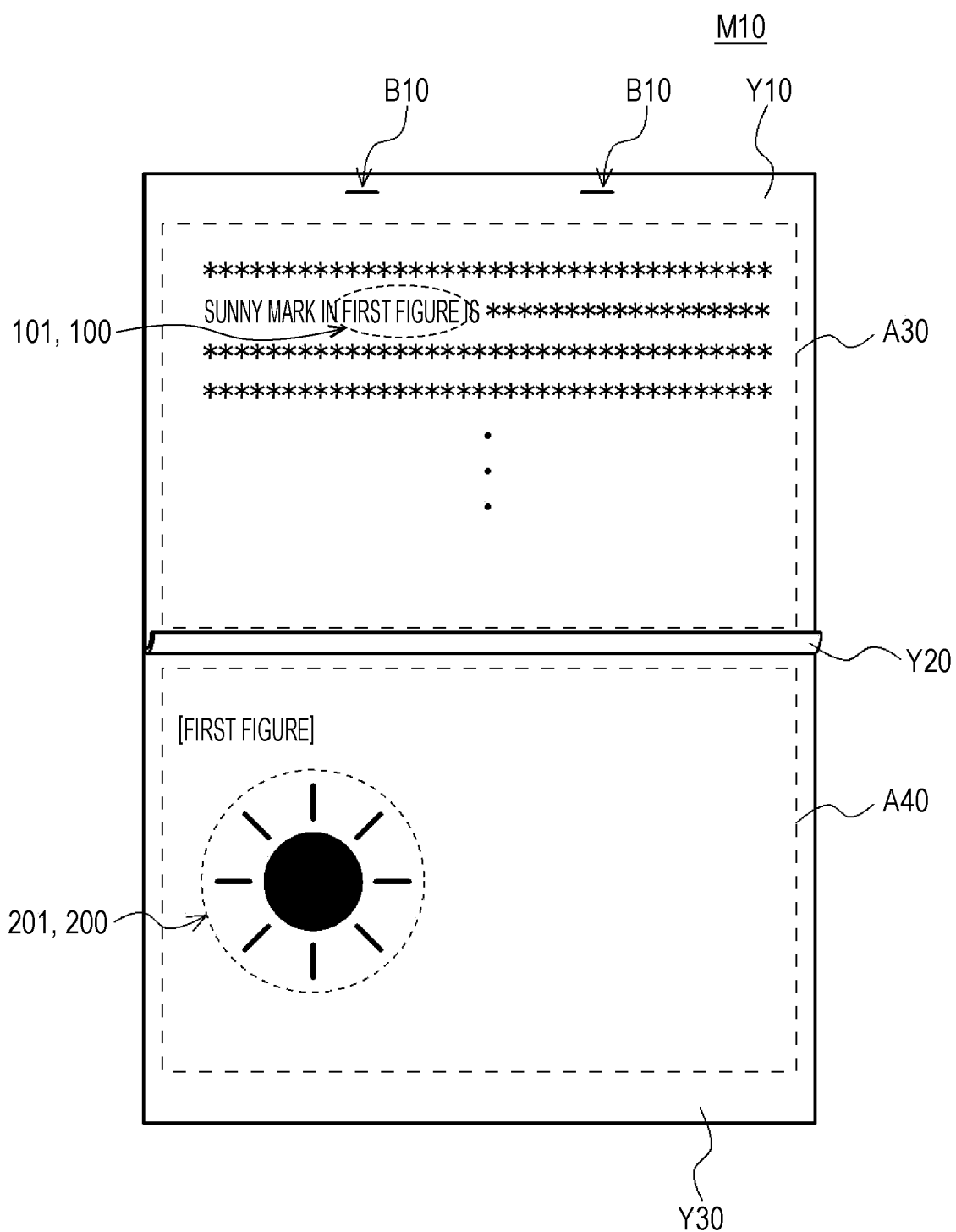
FIG. 24 is a view from a user looking down on a printout in the state of FIG. 23.

In this case, when the user turns up the lower half of the sheets Y10 and Y20 in the printout M10 (refer to FIG. 23), the user can visually recognize the reference destination part 200 (for example, the reference destination part 200 disposed in the lower area A40 on the front side of the sheet Y30) that was not seen by the user due to the lower half of the sheets Y10 and Y20 (refer to FIG. 24). FIG. 24 shows a state in which the lower half area (particularly, the lower end side) of the sheets Y10 and Y20 (first and second sheets) in the printout M10 is turned up (or folded) by the user and the lower half area is standing in a substantially vertical direction near the reference position C10 (upright state). In such a state, the user can simultaneously see the reference source part 101 and the reference destination part 201 in the bound printout M10.

Alternatively, when the reference source part 101 is arranged in an area other than the upper area A30 on the front side of the arrangement sheet Y10 of the reference source part 101, any one of two to four specific areas on a sheet (for example, sheet Y30) different from the arrangement sheet Y10 of the reference source part 101 in the printout M10 is determined as the arrangement target area of the reference destination part 201 (step S18A).

Here, a case will be described in which the reference source part 101 is arranged in the lower area A40 of the front side of the arrangement sheet Y10 of the reference source part 101. In this case, any one of the three specific areas, the upper area A30 and the lower area A40 on the front side of the sheet Y30 and the upper area A30 on the back side of the sheet Y30, is determined as the arrangement target area of the reference destination part 201.

Figure 25:
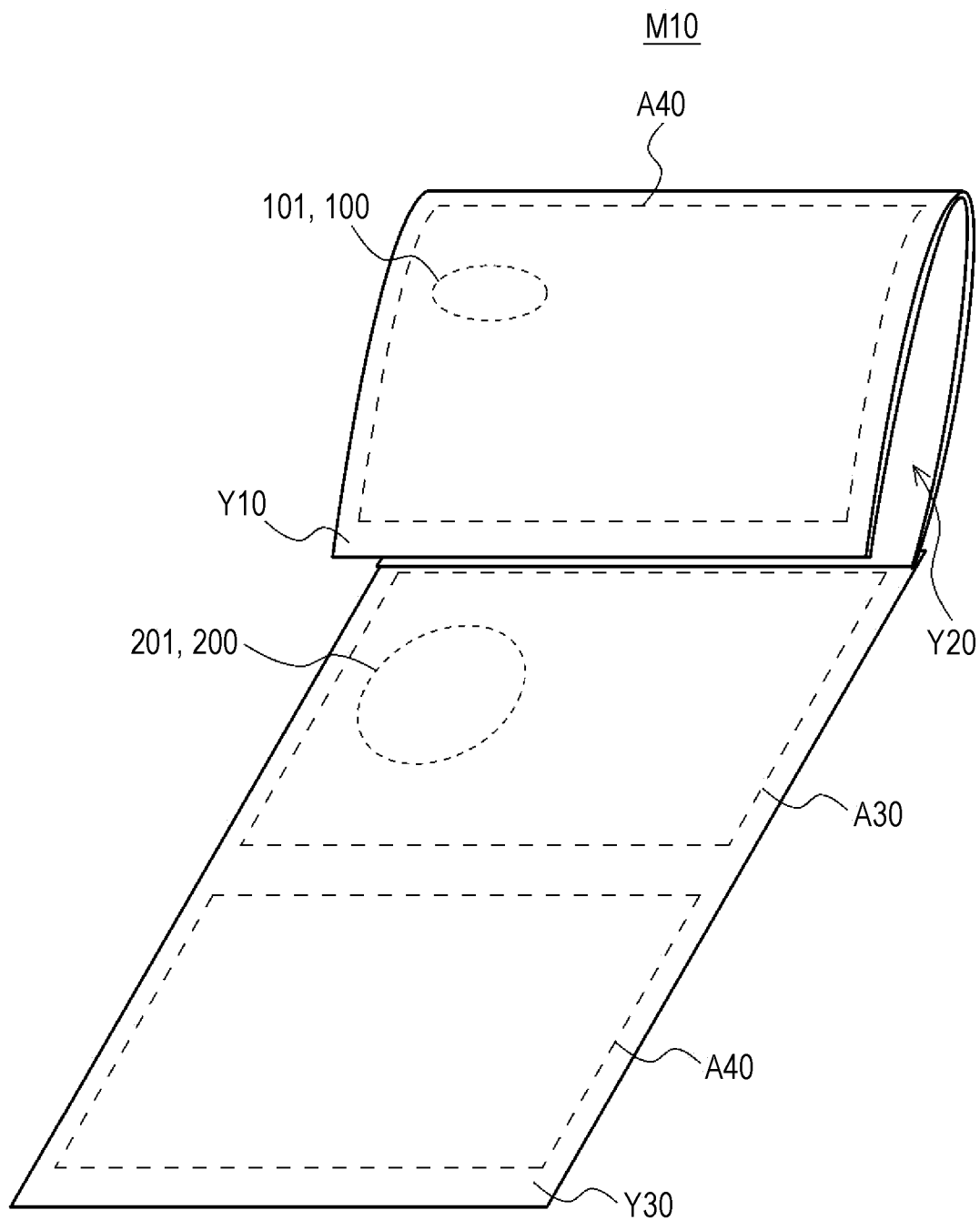
FIG. 25 is a view illustrating a state in which first and second sheets of the printout are folded up and down and mountain-folded near the center position, and lower right end parts of the first and second sheets are brought close to the upper end part of a third sheet.

For example, the upper area A30 (FIG. 25) of the front side of the sheet Y30 is determined as the arrangement target area of the reference destination part 201. In this case, the user mountain-folds the sheets Y10 and Y20 of the printout M10 up and down near the center position C12, and brings the lower ends of the sheets Y10 and Y20 close to the upper end of the sheet Y30 (refer to FIG. 25). Thus, the user can view the reference source part 101 arranged in the lower area A40 of the front side of the sheet Y10 and the reference destination part 201 arranged in the upper area A30 (FIG. 25) on the front side of the sheet Y30 at the same time.

Alternatively, the lower area A40 of the front side of the sheet Y30 may be determined as the arrangement target area of the reference destination part 201. Even in this case, by folding the sheets Y10 and Y20 in the same manner as in FIG. 25, the user can simultaneously see the reference source part 101 arranged in the lower area A40 of the front side of the sheet Y10 and the reference destination part 201 arranged in the lower area A40 of the front side of the sheet Y30.

Figure 26:
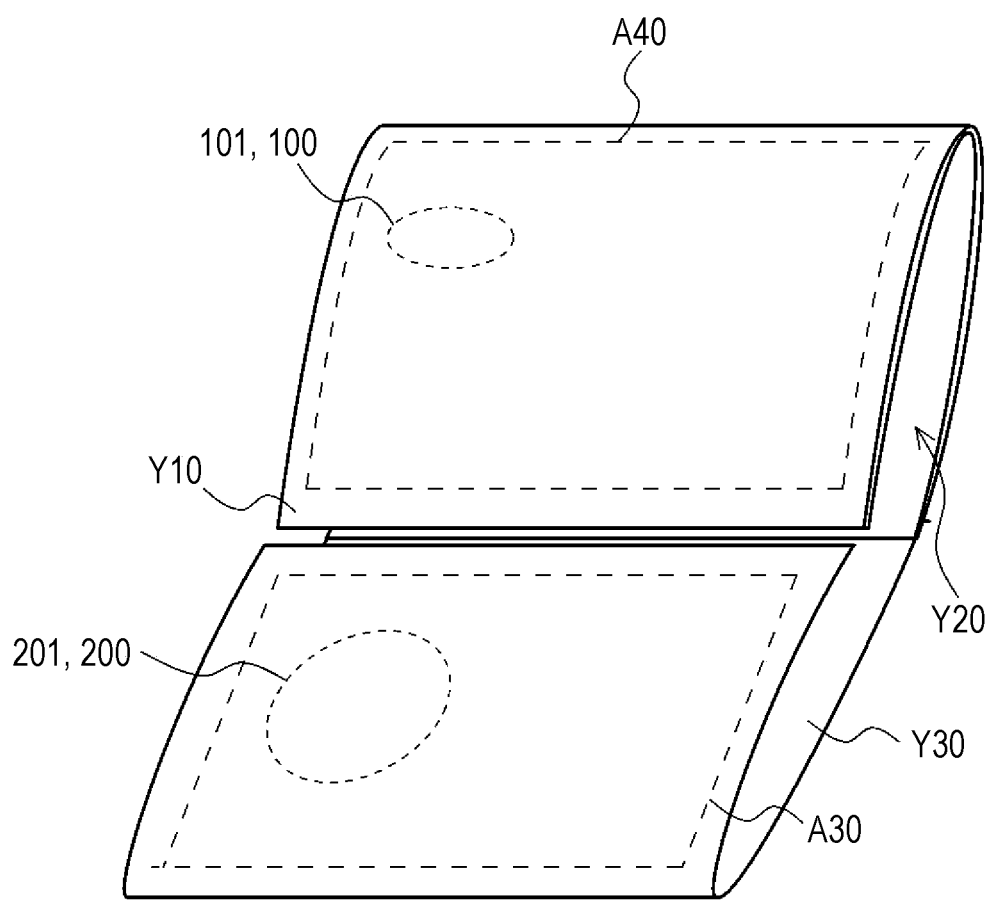
FIG. 26 is a view illustrating a state in which the third sheet of the printout in the state of FIG. 25 is folded up and down and valley-folded near the center position.

Alternatively, the upper area A30 (FIG. 26) of the back side of the sheet Y30 in the printout M10 may be determined as the arrangement target area of the reference destination part 201. In this case, by valley-folding the sheet Y30 in the printout M10 in the state of FIG. 25 up and down near the center position C11 (refer to FIG. 26), the user can see the reference source part 101 arranged in the lower area A40 of the front side of the sheet Y10 and the reference destination part 201 arranged in the upper area A30 (FIG. 26) on the back side of the sheet Y30 at the same time.

Note that, here, the setting item "single-sided/double-sided" is set to the setting value "double-sided", but is not limited to this, and in the case where the setting item "single-sided/double-sided" is set to the setting value "single-sided", the following operation is performed.

For example, when the reference source part 101 is arranged in the upper area A30 of the front side of the arrangement sheet of the reference source part 101, in the printout M10, the lower area A40 of the front side of a sheet different from the arrangement sheet Y10 of the reference source part 101 (refer to FIG. 24) is determined as the arrangement target area of the reference destination part 201 (200) (step S17A (FIG. 4)).

Alternatively, when the reference source part 101 is arranged in the lower area A40 of the front side of the arrangement sheet Y10 of the reference source part 101, one of the two specific areas (refer to FIG. 25) of the upper area A30 and the lower area A40 of the front side of the sheet different from the arrangement sheet Y10 of the reference source part 101 in the printout M10 is determined as the arrangement target area of the reference destination part 201 (step S18A).

When the setting item "binding direction" is set to the setting value "top binding", such an operation is performed. Note that the idea of another embodiment may be applied to the setting value "top binding" of the setting item "binding direction".

Further, in each of the above embodiments and the like, although the arrangement target area of the reference destination part 200 in the printout M10 is changed based on the arrangement position of the reference source part 100 in the printout M10 and the binding position B10 in the printout M10, the embodiments are not limited thereto.

For example, on the contrary, based on the arrangement position of the reference destination part 200 (201) in the printout M10 and the binding position B10 in the printout M10, the arrangement target area of the reference source part 100 (101) in the printout M10 may be changed.

In this case, in FIG. 4, the "reference source part" is replaced with the "reference destination parts", and the "reference destination part" is replaced with the "reference source part". Here, it is assumed that a print instruction to print out a "single-sided" print target document D10 (refer to FIGS. 6 and 7) as in the first embodiment is received.

Specifically, after steps S11 to S14 in FIG. 4, in step S15A, whether or not the reference destination part 200 (201) of the printout M10 (specifically, the virtual printout) is arranged on the front side of the sheet is determined. If "YES" is determined in step S15A, the process proceeds from step S15A to step S16.

In step S16, of the entire area on the front side of the arrangement sheet (here, the third sleet Y30) of ti reference destination part 201 in the printout M10, whether or not the reference destination part 201 is arranged in an area located on the same side as the binding position (left end part position) B10 with respect to the reference position (center position) C10 in a specific direction (here, the left and right direction) on the sheet surface is determined. If "YES" is determined in step S16, the process proceeds from step S16 to step S17A.

Then, in step S17A, of the entire area on the front side of a sheet different from the arrangement sheet Y30 of the reference destination part 201 (for example, the first sheet Y10 including the original arrangement position of the reference source part 101), an area located on the opposite side of the binding position B10 with respect to the reference position C10 in a specific direction (left and right direction) is determined as the arrangement target area of the reference source part 101.

Figure 37:
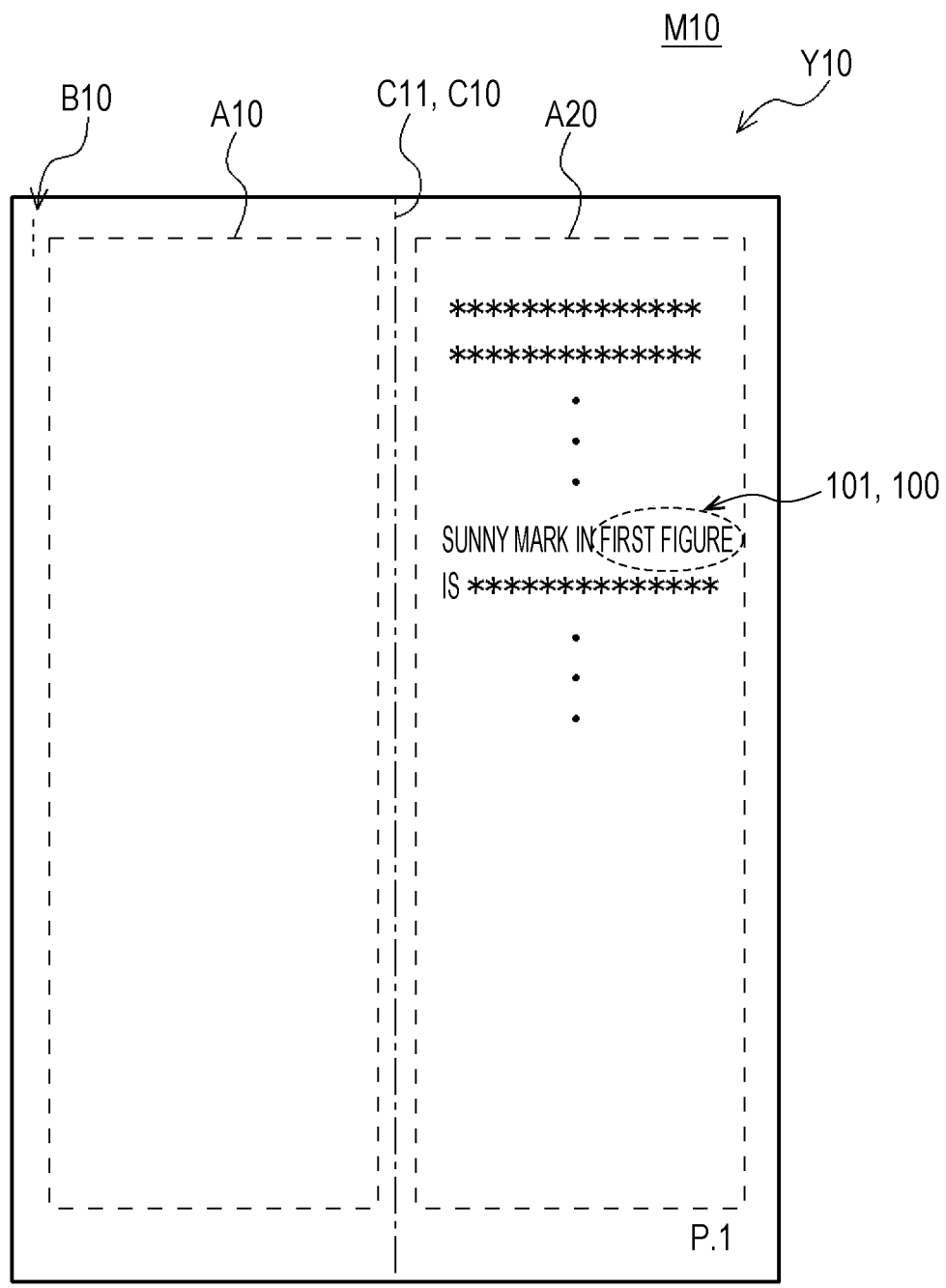
FIG. 37 is a view of a first page of the printout according to the modification.

Specifically, for example, the right area A20 of the two divided areas of the left ara A0 and the right area A20 of the front side of the sheet Y10 is determined as the arrangement target area (new arrangement area) of the reference source part 101 (refer to FIG. 37). Further, the left area A10 of the sheet Y10 is determined as a blank area. Note that, the text that is originally arranged in the right area of the first page in the print target document D10 composed of two columns (refer also to FIG. 6) is arranged, for example, on the next sheet (specifically, the left area A10 or the right area A20 of the next sheet).

In this case, by folding the first and second sheets Y10 and Y20 of the printout M10 as illustrated in FIG. 13, the user can simultaneously see the reference source part 101 arranged in the right area A20 of the first sheet and the reference destination part 201 arranged in the left area A10 of the first and subsequent sheets. Therefore, compared with the case where, in the bound printout M10, the reference source part 100 and the reference destination part 200 corresponding to the reference source part 100 are always arranged as it is at the original arrangement position in the print target document D10 (here, the case where both the reference source part 101 and the reference destination part 201 are arranged in the left area A10 (refer to FIGS. 6 and 7)), the reference source part 100 and the reference destination part 200 can be arranged at more appropriate positions.

In the case where the binding position B10 is included in the left area A10 in the printout M10 and the reference destination part 201 is arranged in the right area A20 (FIG. 9) of the sheet Y30 in the printout M10, one of two specific areas, the left area A10 and the right area A20 on the sheet (for example, sheet Y10) different from the arrangement sheet Y30 of the reference destination part 201 is determined as the arrangement target area of the reference source part 101 (step S18A).

As described above, based on the arrangement position of the reference destination part 200 in the printout M10 and the binding position B10 in the printout M10, the arrangement target area of the reference source part 100 in the printout M10 may be changed.

Figure 36:
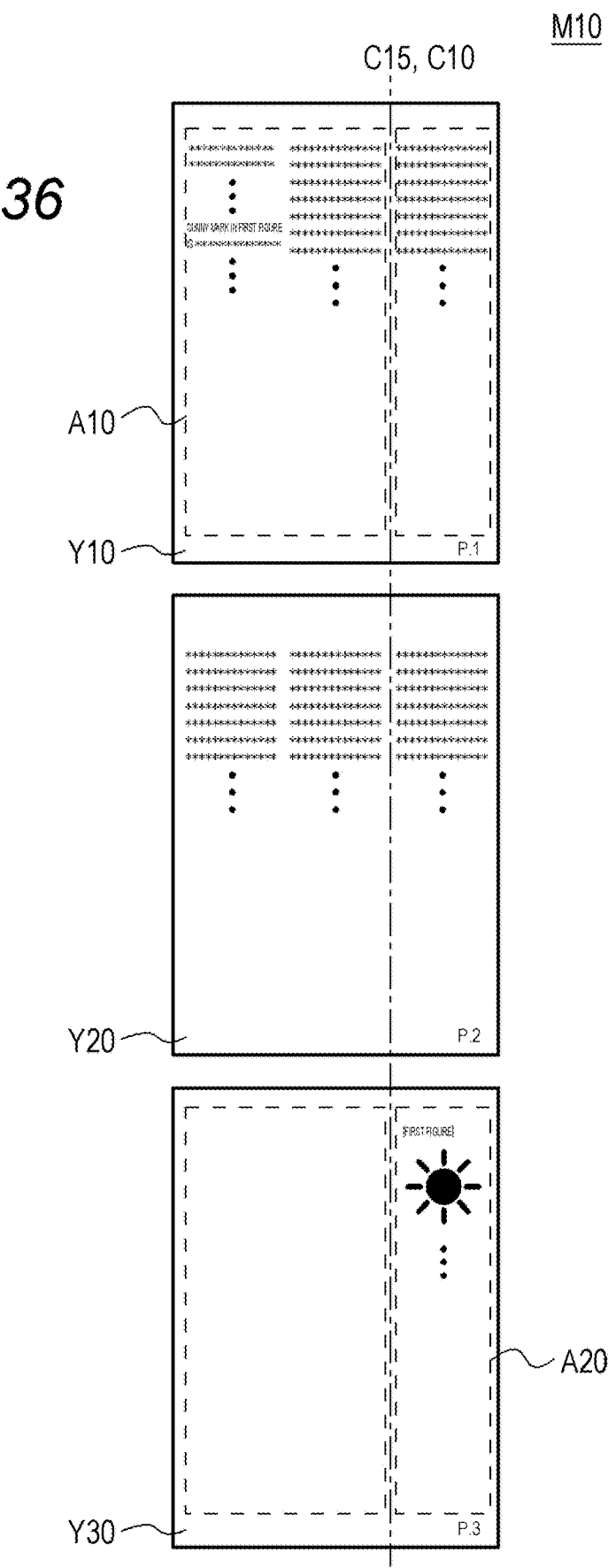
FIG. 36 is a view of the entire printout according to the modification.

Further, in each of the above embodiments and the like, the center position in the specific direction is exemplified as the reference position C10. However, the embodiments are not limited thereto, and a position other than the center position in the specific direction may be the reference position C10. For example, the reference position C10 may be a position on the other side by a predetermined amount from one end of the sheet in a specific direction (for example, a position C15 on the right side from the left end of the sheet about two-thirds of the length of the sheet in the left and right direction (refer to FIG. 36))

Further, in each of the above embodiments and the like, although the computer 50 (a device different from the print output device) is illustrated as a print control device that performs the operation of FIG. 4 (or FIG. 31) and the like, but the embodiments are not limited thereto, and the print control device may be the print output device (MFP10) itself. Specifically, when an instruction to execute a print job (also referred to as a box print job) for printing out the print target document D10 in the MFP 10 (specifically, the storage 5 of the MFP 10) is given by the user, the operation of FIG. 4 (or FIG. 31) or the like may be performed in the MFP 10.

Although embodiments of the present invention have been described and illustrated in detail, the disclosed embodiments are made for purposes of illustration and example only and not limitation. The scope of the present invention should be interpreted by terms of the appended claims.

What is claimed is:

1. A non-transitory recording medium storing a computer readable program causing a computer, which is incorporated in a print control device that controls a print job, to perform:
   a) determining whether or not a reference source part included in a print target document related to the print job and a reference destination part included in the print target document and corresponding to the reference source part are arranged on different pages in a printout obtained by printing out the print target document;
   b) estimating a binding position in the printout; and
   c) changing at least one of arrangement target areas of the reference source part and the reference destination part in the printout based on the binding position and the arrangement position of the reference source part or the reference destination part in the printout, when it is determined in the a) that the reference source part and the reference destination part are arranged on different pages in the printout.

2. The non-transitory recording medium storing a computer readable program according to claim 1,
   wherein, in the c), the arrangement target area of the reference destination part in the printout is changed based on the binding position and the arrangement position of the reference source part in the printout.

3. The non-transitory recording medium storing a computer readable program according to claim 2,
   wherein, in the c), when the reference source part is arranged in a first area that is an area located on the same side as the binding position of two divided areas in which the entire area on the front side of a first sheet in the printout is divided into two at a reference position in a specific direction,
   a second area that is an area located on an opposite side to the binding position of two divided areas in which the entire area on the front side of a second sheet different from the first sheet in the printout is divided into two at the reference position in the specific direction is determined as an arrangement target area of the reference destination part.

4. The non-transitory recording medium storing a computer readable program according to claim 3,
   wherein, in the c), when the left end part of the printout is estimated in the b) as the binding position, the entire area on the front side of the first sheet and the entire area on the front side of the second sheet are each divided into two divided areas of a left area and a right area at the reference position in a left and right direction,
   the first area is the left area on the front side of the first sheet, and
   the second area is the right area on the front side of the second sheet.

5. The non-transitory recording medium storing a computer readable program according to claim 3, wherein, in the c), when the upper end part of the printout is estimated in the b) as the binding position, the entire area on the front side of the first sheet and the entire area on the front side of the second sheet are each divided into two divided areas of an upper area and a lower area at the reference position in the up and down direction, the first area is the upper area on the front side of the first sheet, and the second area is the lower area on the front side of the second sheet.

6. The non-transitory recording medium storing a computer readable program according to claim 3, wherein, in the c), when a plurality of different reference source parts is arranged in the first area on the front side of the first sheet, the second area on the front side of the second sheet that is a sheet common to a plurality of reference destination parts corresponding to a plurality of the reference source parts is determined as an arrangement target area of each of a plurality of the reference destination parts.

7. The non-transitory recording medium storing a computer readable program according to claim 6, wherein, in the c), an appearance order of each of a plurality of the reference destination parts in the second area is determined based on the number of appearances of the reference source parts corresponding to each of a plurality of the reference destination parts in the first area.

8. The non-transitory recording medium storing a computer readable program according to claim 2, wherein the print job is a booklet print job that folds the printout in two in a specific direction, and in the c), when the reference source part is arranged in a first area which is an area located on the same side as the binding position, of two divided areas in which the entire area of a first page in which the reference source part is arranged in the printout and is an odd page is divided into two at a reference position in the specific direction, a second area that is an area located on an opposite side to the binding position is determined as an arrangement target area of the reference destination part, of two divided areas in which the entire area of a second page, which is different from the first page and is an odd page in the printout, is divided into two at the reference position in the specific direction.

9. The non-transitory recording medium storing a computer readable program according to claim 8, wherein, in the c), when the left end part of the printout is estimated in the b) as the binding position, the entire area of the first page and the entire area of the second page are each divided into two divided areas of a left area and a right area at the reference position in the left and right direction, the first area is the left area of the first page, and the second area is the right area of the second page.

10. The non-transitory recording medium storing a computer readable program according to claim 8, wherein, in the c), when the upper end part of the printout is estimated as the binding position in the b), the entire area of the first page and the entire area of the second page are each divided into two divided areas of an upper area and a lower area at the reference position in the up and down direction, the first area is the upper area of the first page, and the second area is the lower area of the second page.

11. The non-transitory recording medium storing a computer readable program according to claim 8, wherein, in the c), when a plurality of different reference source parts is arranged in the first area on the first page, the second area of the second page that is a page common to a plurality of reference destination parts corresponding to a plurality of the reference source parts is determined as an arrangement target area of each of a plurality of the reference destination parts.

12. The non-transitory recording medium storing a computer readable program according to claim 1, wherein, in the c), the arrangement target area of the reference source part in the printout is changed based on the binding position and the arrangement position of the reference destination part in the printout.

13. The non-transitory recording medium storing a computer readable program according to claim 1, wherein, in the document data of the print target document, the reference source part and the reference destination part are associated with each other using tag data.

14. A print control device that controls a print job, comprising:

a determination part that determines whether or not a reference source part included in a print target document related to the print job, and a reference destination part included in the print target document and corresponding to the reference source part are arranged on different pages in a printout obtained by printing out the print target document;

an estimation part that estimates a binding position in the printout; and a change part that changes at least one of the arrangement target areas of the reference source part and the reference destination part in the printout based on the binding position and the arrangement position of the reference source part or the reference destination part in the printout, when it is determined in the determination part that the reference source part and the reference destination part are arranged on different pages in the printout.

15. The print control device according to claim 14, wherein the change part changes the arrangement target area of the reference destination part in the printout, based on the binding position and the arrangement position of the reference source part in the printout.

16. The print control device according to claim 15, wherein, when the reference source part is arranged in a first area that is an area located on the same side as the binding position, of two divided areas in which the entire area on a front side of a first sheet in the printout is divided into two at a reference position in a specific direction, the change part determines a second area that is an area located on an opposite side to the binding position as the arrangement target area of the reference destination part, of two divided areas in which the entire area on a front side of a second sheet different from the first sheet in the printout is divided into two at the reference position in the specific direction.

17. The print control device according to claim 16 wherein, when the left end part of the printout is estimated as the binding position, the change pa divides the entire area on the front side of the first sheet and the entire area on the front side of the second sheet each in two divided areas of a left area and a right area at the reference position in the left and right direction, the first area is the left area on the front side of the first sheet, and the second area is the right area on the front side of the second sheet.

18. The print control device according to claim 16, wherein, when the upper end part of the printout is estimated as the binding position, the change part divides the entire area on the front side of the first sheet and the entire area on the front side of the second sheet each in two divided areas of an upper area and a lower area at the reference position in the up and down direction, the first area is the upper area on the front side of the first sheet, and the second area is the lower area on the front side of the second sheet.

19. The print control device according to claim 16, wherein, when a plurality of different reference source parts is arranged in the first area on the front side of the first sheet, the change part determines the second area on the front side of the second sheet that is a sheet common to a plurality of reference destination parts corresponding to a plurality of the reference source parts as an arrangement target area of each of a plurality of the reference destination parts.

20. The print control device according to claim 19, wherein, the change part determines an appearance order of each of a plurality of the reference destination parts in the second area, based on the number of appearances of the reference source parts corresponding to each of a plurality of the reference destination parts in the first area.

21. The print control device according to claim 15, wherein the print job is a booklet print job that folds the printout in two in a specific direction, and when the reference source part is arranged in a first area which is an area located on the same side as the binding position, of two divided areas in which the entire area of a first page in which the reference source part is arranged in the printout and is an odd page is divided into two at a reference position in the specific direction, the change part determines a second area that is an area located on an opposite side to the binding position as an arrangement target area of the reference destination part, of two divided areas in which the entire area of a second page, which is different from the first page and is an odd page in the printout is divided into two at the reference position in the specific direction.

22. The print control device according to claim 21, wherein, when the left end part of the printout is estimated as the binding position, the change part divides the entire area of the first page and the entire area of the second page each in two divided areas of a left area and a right area at the reference position in the left and right direction, the first area is the left area of the first page, and the second area is the right area of the second page.

23. The print control device according to claim 21, wherein when the upper end part of the printout is estimated as the binding position, the change part divides the entire area of the first page and the entire area of the second page each in two divided areas of an upper area and a lower area at the reference position in the up and down direction, the first area is the upper area of the first page, and the second area is the lower area on the second page.

24. The print control device according to claim 21, wherein, when a plurality of different reference source parts is arranged in the first area on the first page, the change part determines the second area of the second page that is a page common to a plurality of reference destination parts corresponding to a plurality of the reference source parts as an arrangement target area of each of a plurality of the reference destination parts.

25. The print control device according to claim 14, wherein the change part changes the arrangement target area of the reference source part in the printout based on the binding position and the arrangement position of the reference destination part in the printout.

26. The print control device according to claim 14, wherein, in the document data of the print target document, the reference source part and the reference destination part are associated with each other using tag data.

* * * * *